Sept. 12, 1961  H. J. EMMEL  2,999,425
SLIDE PROJECTION APPARATUS
Filed Oct. 12, 1959  14 Sheets-Sheet 1

INVENTOR.
HENRY J. EMMEL
BY
Frank C. Parker
ATTORNEY

Sept. 12, 1961  H. J. EMMEL  2,999,425
SLIDE PROJECTION APPARATUS
Filed Oct. 12, 1959  14 Sheets-Sheet 2

INVENTOR.
HENRY J. EMMEL
BY Frank C. Parker
ATTORNEY

Sept. 12, 1961  H. J. EMMEL  2,999,425
SLIDE PROJECTION APPARATUS
Filed Oct. 12, 1959  14 Sheets-Sheet 3
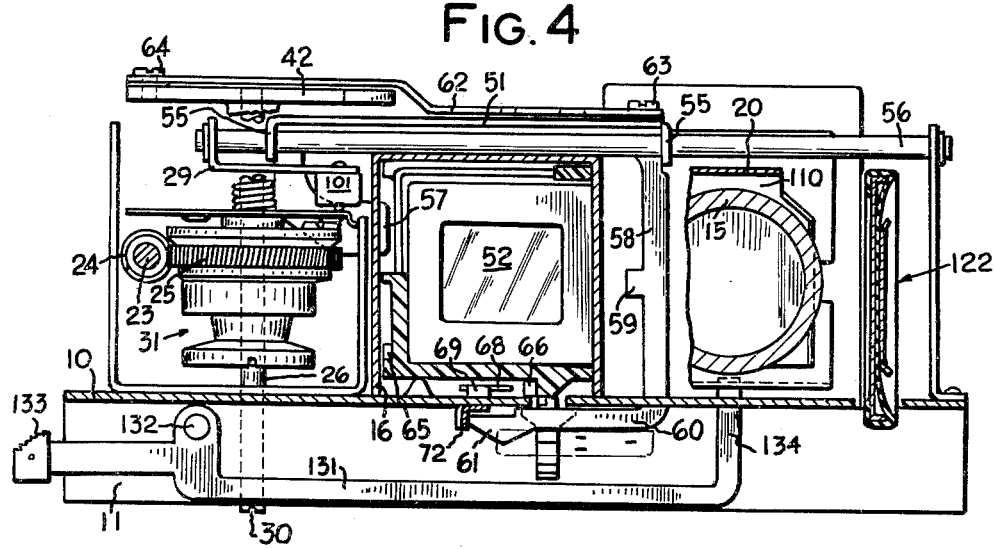
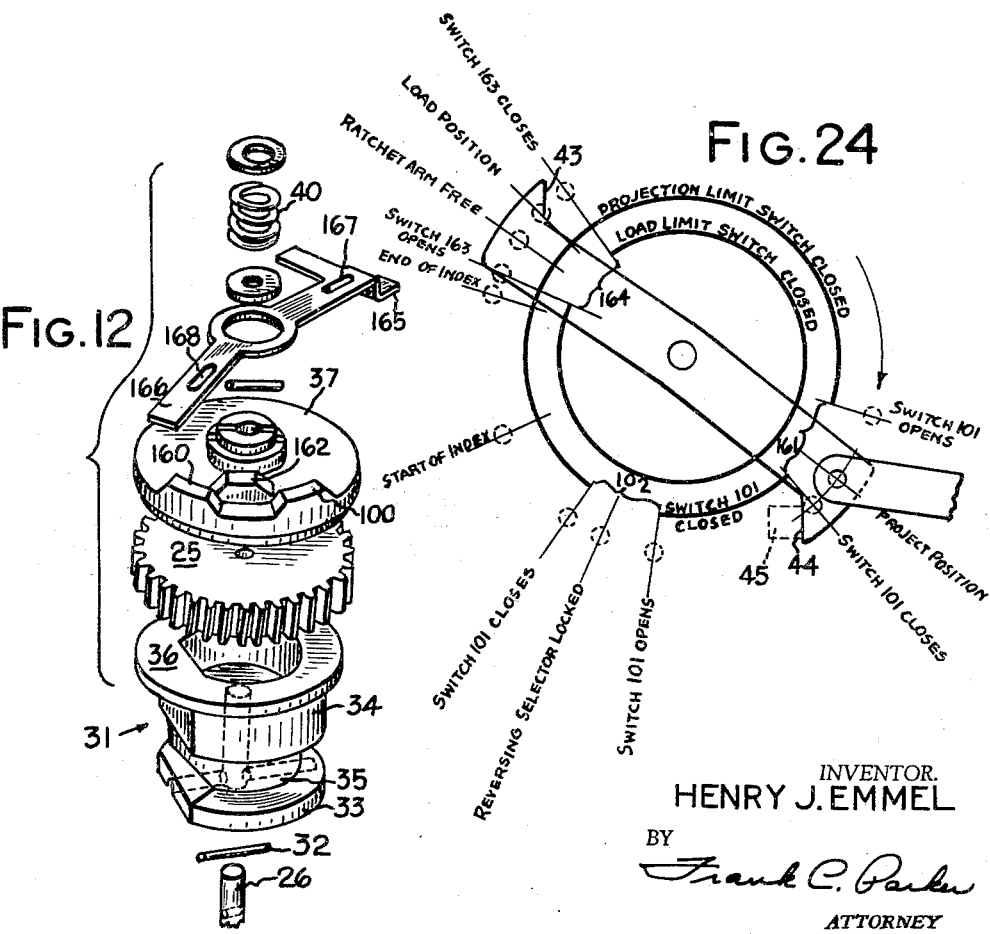
INVENTOR.
HENRY J. EMMEL
BY
*Frank C. Parker*
ATTORNEY Sept. 12, 1961  H. J. EMMEL  2,999,425
SLIDE PROJECTION APPARATUS
Filed Oct. 12, 1959  14 Sheets-Sheet 4

INVENTOR.
HENRY J. EMMEL
BY
Frank C. Parker
ATTORNEY

Sept. 12, 1961  H. J. EMMEL  2,999,425
SLIDE PROJECTION APPARATUS
Filed Oct. 12, 1959  14 Sheets-Sheet 6
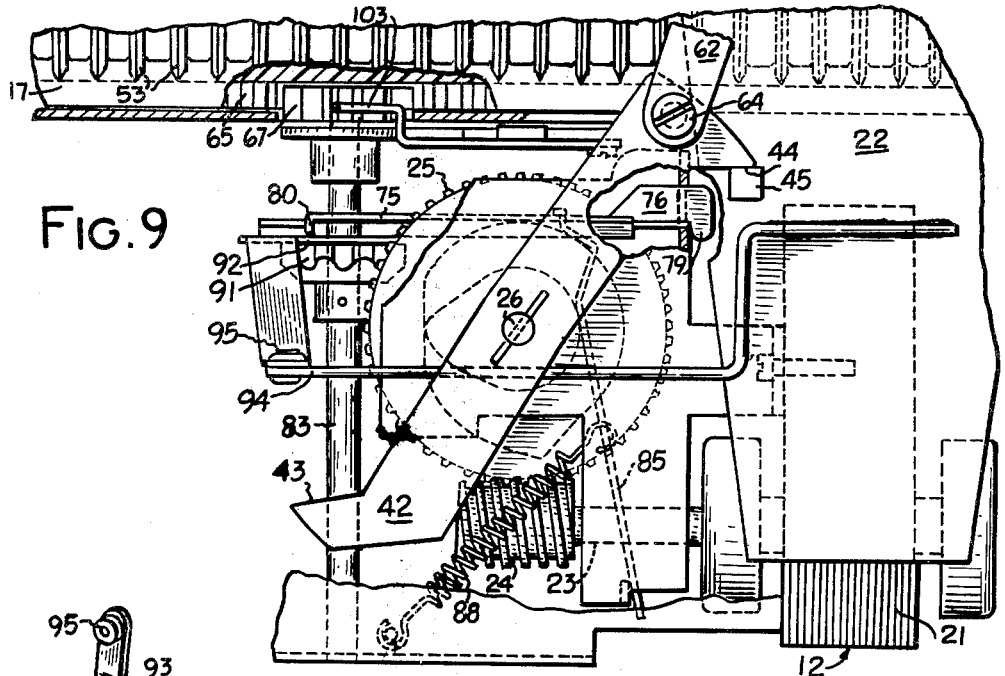
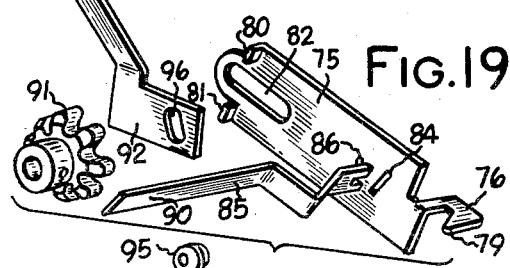
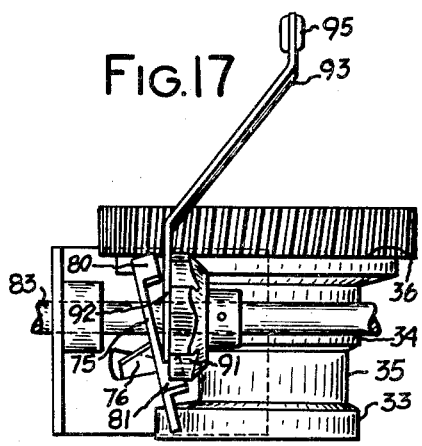
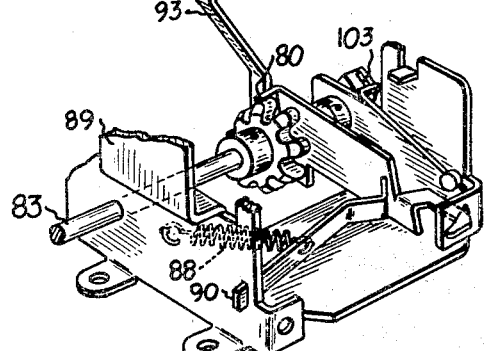
INVENTOR.
HENRY J. EMMEL
BY
Frank C. Parker
ATTORNEY

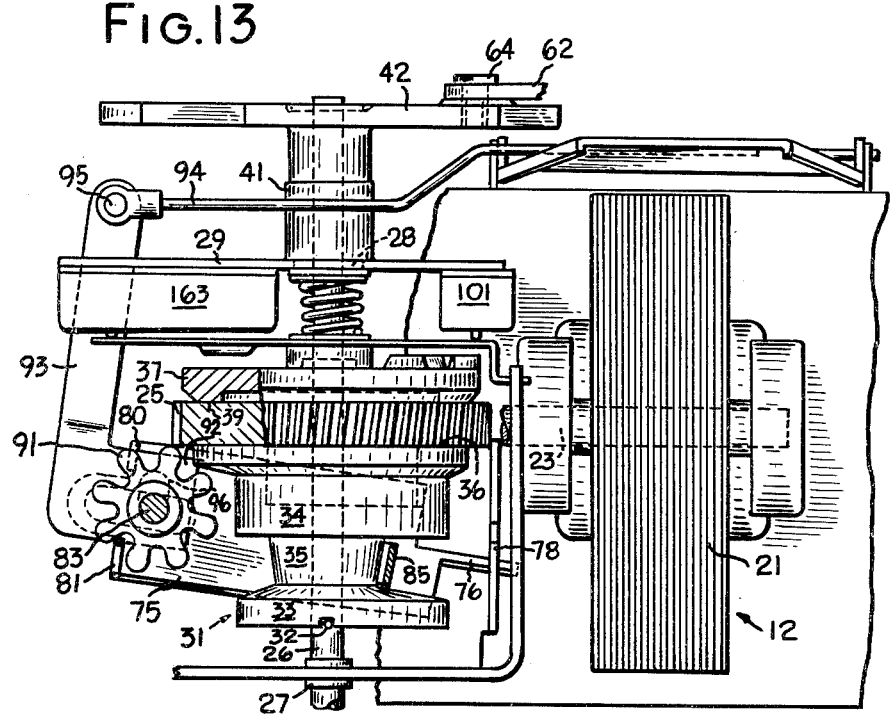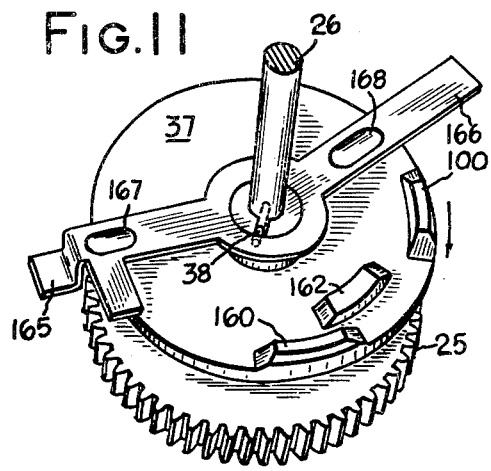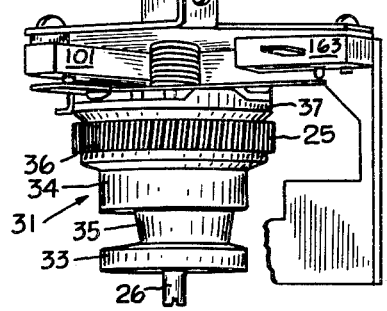

Sept. 12, 1961 H. J. EMMEL 2,999,425
SLIDE PROJECTION APPARATUS
Filed Oct. 12, 1959 14 Sheets-Sheet 8

INVENTOR.
HENRY J. EMMEL
BY
Frank C. Parker
ATTORNEY

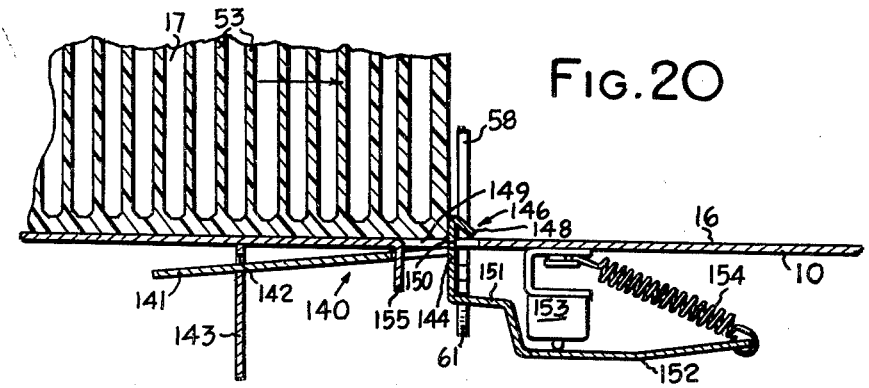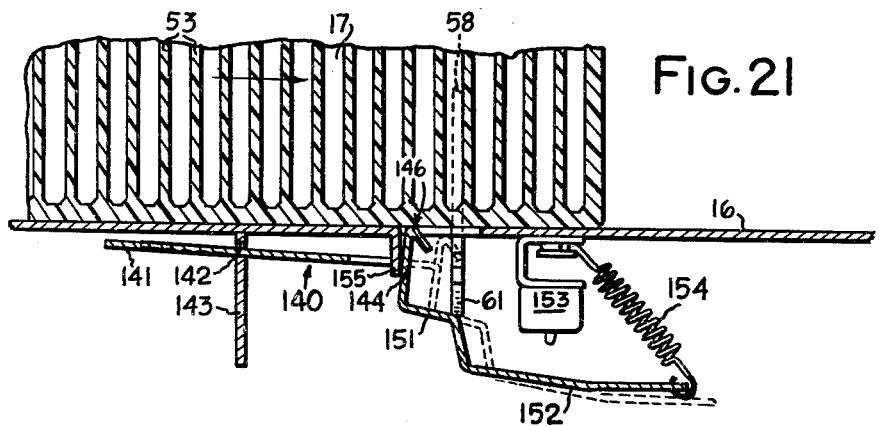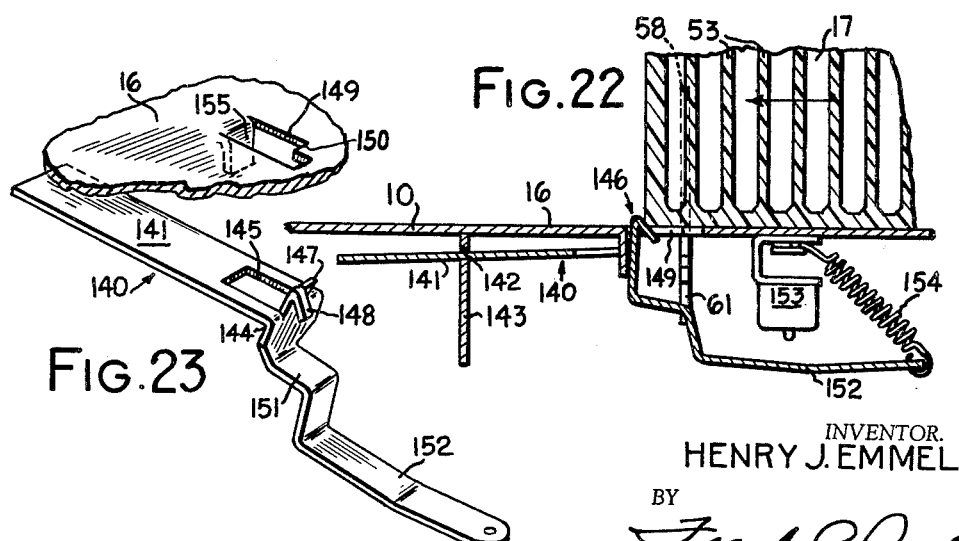

INVENTOR.
HENRY J. EMMEL

Sept. 12, 1961  H. J. EMMEL  2,999,425
SLIDE PROJECTION APPARATUS
Filed Oct. 12, 1959  14 Sheets-Sheet 11

INVENTOR.
HENRY J. EMMEL
BY
Frank C. Parker
ATTORNEY

INVENTOR.
HENRY J. EMMEL
BY
Frank C. Parker
ATTORNEY

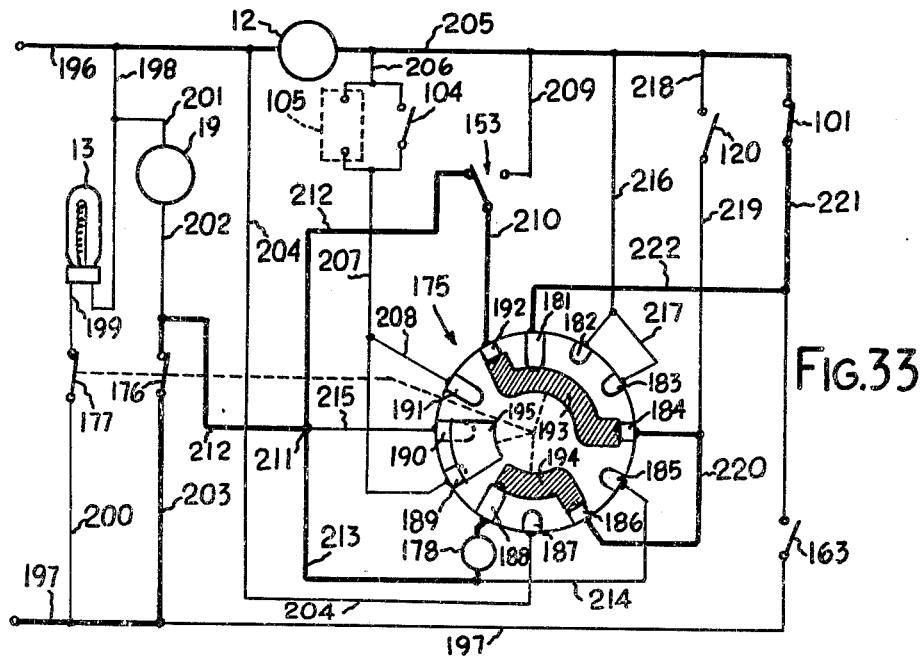
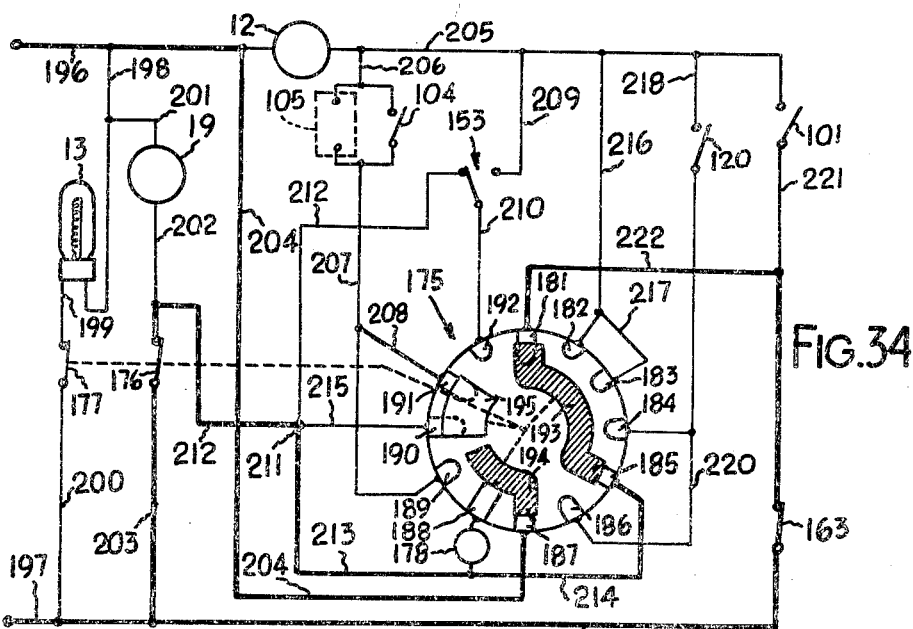

United States Patent Office 2,999,425
Patented Sept. 12, 1961

2,999,425
SLIDE PROJECTION APPARATUS
Henry J. Emmel, Irondequoit, N.Y., assignor to Bausch
& Lomb Incorporated, a corporation of New York
Filed Oct. 12, 1959, Ser. No. 845,867
7 Claims. (Cl. 88—28)

The present invention relates in general to projection apparatus and more particularly to a slide projector having a removable magazine or tray for holding a plurality of transparent slides which are to be successively projected upon a viewing screen.

In slide projectors of the general character disclosed herein there are usually employed a number of cooperable mechanisms which mutually coact with one another in order to perform the operations necessary to successively project the different slides upon a viewing screen. In this regard, there is usually provided a holder for mounting a slide tray, means for successively moving slides from the tray to projection position and returning the slides to the tray, means for effecting the projection of an image from the slides onto a viewing screen, automatic timer mechanism for controlling the duration or interval while the image of the slide is projected onto the viewing screen, mechanism for effecting the automatic indexing or feeding of the slide tray in order to successively bring a different slide into position to be projected onto the screen, and control circuits including a plurality of switches for enabling the projection apparatus to perform its desired function in a predetermined sequence of operations. In addition to the foregoing general structural elements which are, of necessity, utilized in practically all slide projectors of this general type, the present invention contemplates the provision of new and improved structural features which enable the more efficient functioning of the projection apparatus and enable the apparatus to perform functions not capable of being performed by conventional slide projectors.

More particularly, the present invention comprises a slide projector including a projection lamp and lens system for projecting an image from a transparent slide onto a screen, a slide tray normally movable in a step by step manner to successively bring transparent slides disposed within the tray into a loading position, a driving motor, means actuated by the motor and effective in time sequence to move the slide disposed in loading position in the tray into a projection position relative to the lens system and lamp and after a predetermined time interval to return the slide to the loading position in the tray. Under normal conditions of operation the motor actuates means which are normally effective upon the return of the slide from projection position to loading position to step the slide tray forwardly to bring the next forward slide in the tray into loading position. The present invention contemplates the additional provision of means actuated by the motor and selectively controlled manually for overriding the usual stepping means and effective upon the return of a slide to loading position to step the side tray rearwardly in order to bring the next rearward slide in the tray into loading position.

Accordingly, it is a primary object of the present invention to provide a slide projector including selectively operable means capable of stepping the slide tray reversely or rearwardly in order to return a previously projected slide to loading position and thereafter to projection position. Such a feature is particularly desirable when the slide projector is utilized for home use as it quite frequently occurs that one or more members of a viewing audience will desire to have a repeat showing of a slide which was projected onto the viewing screen only a moment before and, by the provision of the reversing feature disclosed herein, this repeat showing of a slide is readily accomplished.

A more detailed object of the present invention is to provide a slide projector incorporating the aforementioned reversing feature wherein the reverse operation or reverse stepping operation is initiated by a manually controlled switch mechanism which may be either located on the slide projector itself or may comprise a switch disposed at the end of a remote control cord.

A feature of the present slide projector is a stop mechanism for insuring the accurate positioning of the slide tray when it is initially inserted into the slide tray holder of the projector. In this regard, the stop mechanism insures that the slide tray will be disposed initially in a position such that the first slide in the tray is in loading position and adapted to be moved into projection position upon initiation of operation by the actuation of a manual control switch.

It frequently occurs that after a series of slides have been projected upon a viewing screen, the operator will close up the slide projector and put away the electric cord only to find that he has left out the tray containing the slides that have just been projected on the screen. It is exasperating for the operator to have to again set up the projector in order to replace the slide tray in the projector. The stop mechanism mentioned above is of such a nature that it is possible to insert the slide tray into the tray holder in a reverse direction whereupon the stop mechanism is automatically cammed out of the way to permit such insertion. This feature is one of many which is particularly desirable from the point of view of the operator of the slide projector. The stop mechanism disclosed herein is likewise disclosed and is claimed in the application of C. H. Brumley and J. A. Clark, Serial No. 845,670, filed October 12, 1959.

A further feature of the present slide projector is the control circuit for controlling the various operations of the slide projector. This feature is disclosed and claimed in the application of C. H. Brumley and C. A. Shute, Serial No. 845,999, filed October 12, 1959.

In connection with the foregoing feature, the present slide projector contemplates the provision of a selector switch having four positions, namely: Off position, tray release position, operate position, and edit position.

In the off position of the electric control circuit selector switch all circuits are off unless a slide happens to be in other than loading position and under this condition a temporary energizing circuit for the main driving motor will be completed until the motor returns the particular slide to load or loading position. While the motor circuit is temporarily completed a panel indicator lamp is also on, in order to indicate that the motor is operating temporarily.

When the manual selector switch is moved to "tray release position," the driving motor returns any slide that happens to be in projection position to load position and the motor then stops, leaving only the panel indicator lamp, the projection lamp and the cooling blower on. It is then possible to remove the tray without in any way damaging the projector.

When the selector switch is moved to its "operate position," a slide tray may be inserted in the tray holder until the tray strikes the aforementioned stop mechanism. The projection lamp and cooling blower are on and also the panel lamp is on. Due to the fact that the stop mechanism is in position to hold the tray from going any further into the tray holder, no further operation takes place until either the closure of a manual switch located on the projector itself or the closure of a remote control switch disposed in parallel with the manual switch. The actuation of the manual switch starts the automatic operation of the projector and from then on, until all of the slides have been successively projected upon the viewing screen, the operation of the slide projector is entirely automatic. At any time during the operation of the projector it is possible to effect a reversal of the stepping of the slide tray in order to project a slide onto the viewing screen again merely by holding the manual control switch or the remote control switch closed for a period slightly longer than is necessary to effect premature withdrawal of a slide from view in the event that it is desired to withdraw a slide from view before the timer mechanism initiates the return operation.

If it should happen that one of the slides is upside down in the slide tray or, if for any other reason it is desired to remove a slide from the tray, it is only necessary to move the selector switch from its "operate position" to the "edit position." Under this condition, the slide will be disposed in project position and by depressing a manually controlled edit lever, the slide which is in project position may be lifted upwardly whereupon it may be removed manually from the projector and reinserted in the proper manner.

The foregoing objects and advantages of the present invention as well as numerous others will become more apparent from the following detailed description when read in conjunction with the accompanying drawings wherein:

FIG. 4 is a side elevational view substantially similar to FIG. 3, however showing different features of the slide projector comprising the subject matter of the present invention;

FIG. 9 is a fragmentary top plan view illustrating on an enlarged scale the drive mechanism and the crank for actuating the slide moving member at the condition of operation when a slide is disposed in projection position;

FIG. 10 is a perspective view of certain of the drive mechanism shown in FIG. 9;

FIG. 11 is a perspective view illustrating the details of the control cam mechanism for controlling certain switches in the electrical system;

FIG. 12 is an exploded view illustrating the mechanism shown in FIG. 11;

FIG. 13 is a fragmentary side elevational view of the drive mechanism when the slide indexing mechanism is conditioned for forwardly indexing the slide tray;

FIG. 17 is a view illustrating the slide tray stepping mechanism when the same is conditioned for forward stepping of the slide tray;

FIG. 18 is a fragmentary perspective view of the slide tray stepping mechanism;

FIG. 19 is an exploded perspective view of certain of the slide tray stepping elements;

FIG. 20 is a fragmentary sectional view of the tray stop mechanism and control switch actuated thereby during the condition of operation when a slide tray has just been fully inserted into the slide tray holder;

FIG. 21 is a view similar to FIG. 20 but illustrating the slide tray stop mechanism in its condition of operation after the slide tray has advanced a few steps beyond its initial position;

FIG. 22 is another view similar to FIGS. 20 and 21 but illustrating a slide tray being pushed into the slide tray holder in a reverse direction and further illustrating the depression of the slide tray stop;

FIG. 23 is a detailed view shown in perspective and illustrating the slide tray stop member;

FIG. 24 is a timing diagram indicating the points in the cycle where various switches operate and other functions occur, as well as illustrating the periods while the projection limit switch and the load limit switch are closed;

FIG. 33 is a view illustrating the electrical control circuit with the selector switch in its "operate" position and when the slide is positioned in load position and the energizing circuit for the electric motor is completed in order to return a new slide to projection position;

FIG. 34 is a view illustrating the electrical control circuit with the selector switch disposed in its "edit" position for permitting the lifting of a slide from project position in order to correct the position of the slide or examine the slide disposed in projection position.

Figure 1:
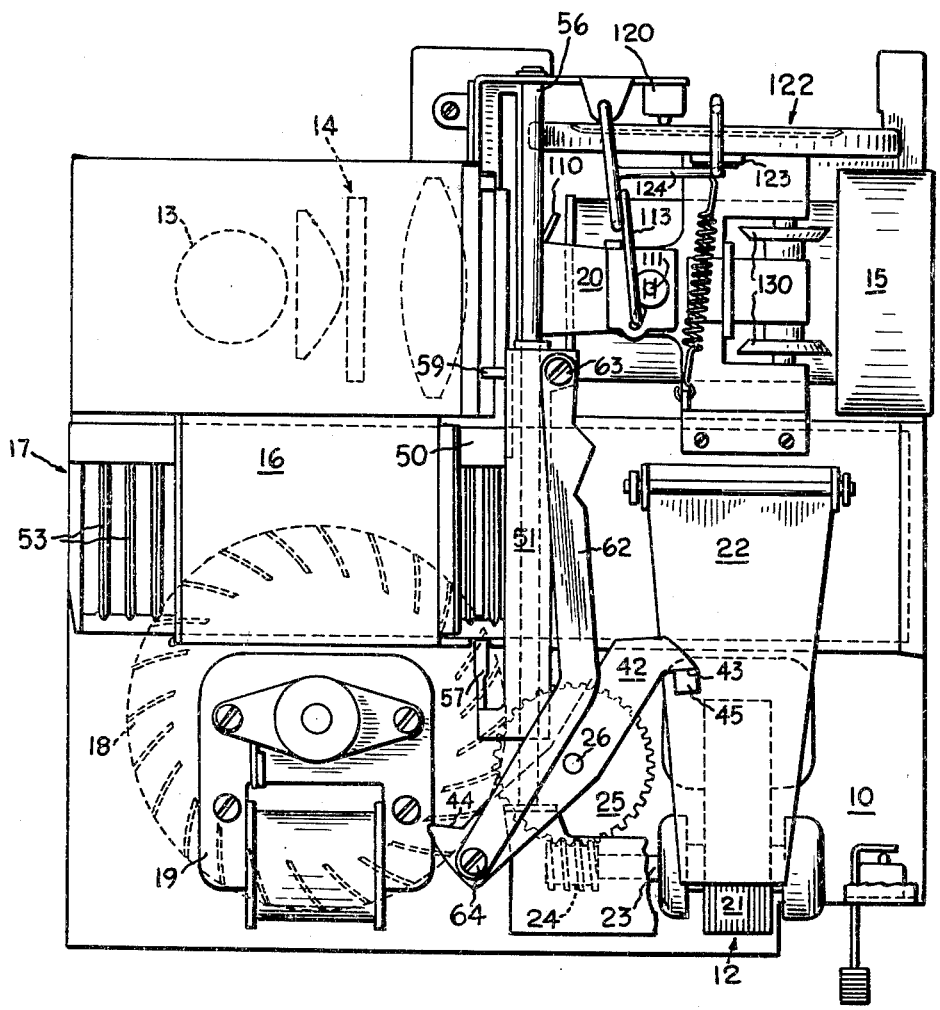
FIG. 1 is a top plan view of the slide projector with the cover cut away and illustrating the principal elements of the slide projector comprising the subject matter of the present invention.
Figure 2:
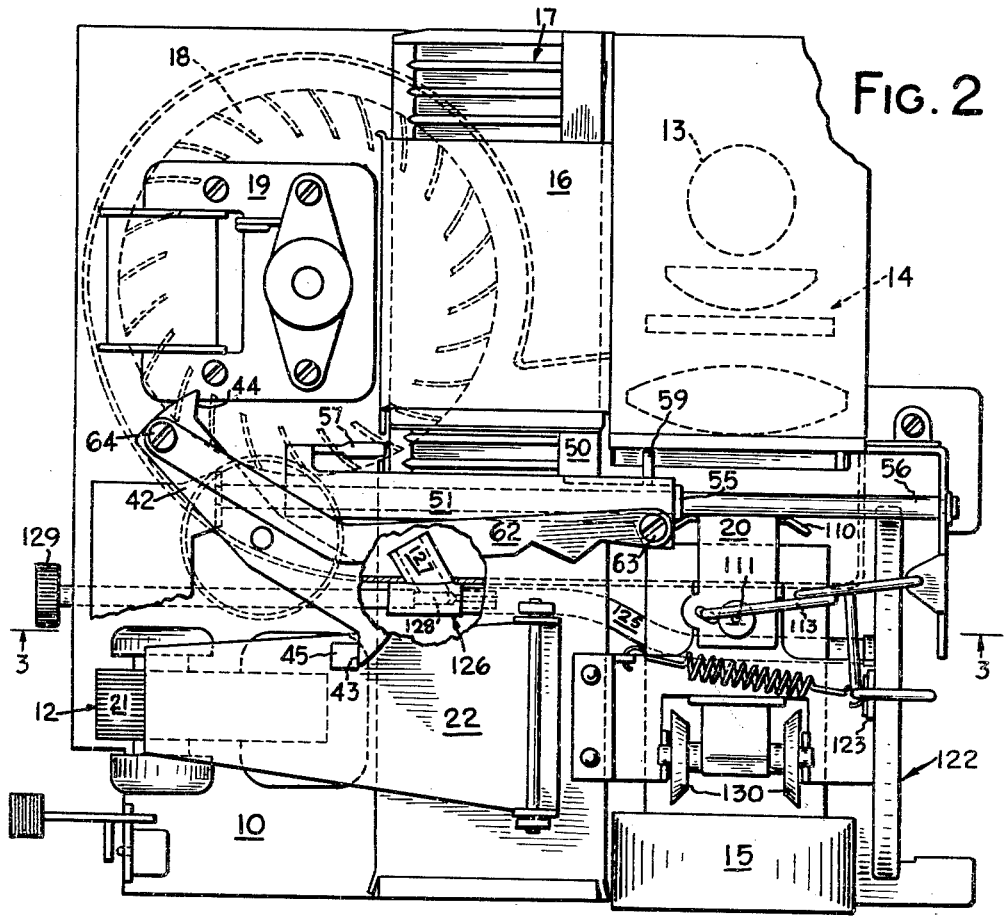
FIG. 2 is a top plan view, similar to FIG. 1, but cut away to illustrate additional elements of the slide projector comprising the subject matter of the present invention.
Figure 3:
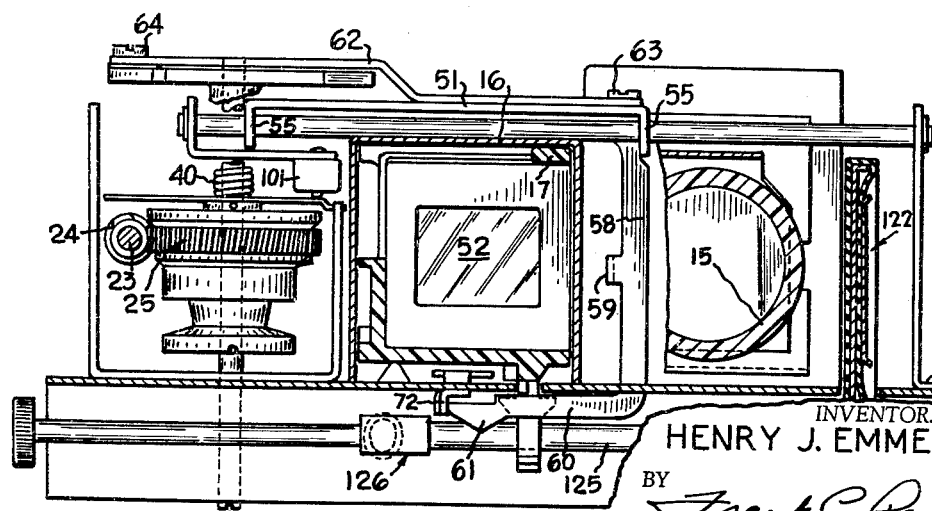
FIG. 3 is a side elevational view shown partly in section and taken substantially along the line 3—3 in FIG. 2 and looking in the direction of the arrows.

With reference now to the drawings, wherein like reference numerals have been utilized in the different views to identify identical parts, the slide projector comprising the subject matter of the present invention comprises a base member 10 which is somewhat raised by means of downwardly turned flanges 11 for the purpose of housing certain of the mechanism disclosed herein, beneath the base 10.

The slide projector also comprises a main drive motor 12, a projection lamp 13, a lens system comprising a condensing lens assembly 14, and a projection lens assembly 15, a slide tray holder 16 for mounting a slide tray 17 for longitudinal movement therein, a blower 18 driven by a blower motor 19, and a shutter 20.

The slide tray 17 is substantially identical with the slide tray disclosed in Boughton application, Serial No. 640,710 filed February 18, 1957, now U.S. Patent No. 2,949,814, and inasmuch as the details of the slide tray 17 form no part of the present invention, it is not deemed necessary to further describe the slide tray 17 herein.

The driving motor 12 comprises a field magnet 21 to which a pivotally mounted spring retracted armature 22 is magnetically responsive. The main driving motor 12 includes a main drive shaft 23 on which a worm gear 24 is mounted for rotation therewith. The worm gear 24 meshes with a spur gear 25 which is rotatably mounted upon a shaft 26 which itself is suitably rotatably mounted, by means of bearings 27 and 28. The bearing assembly 27 merely serves to align the shaft 26 vertically with respect to the base 10. The bearing assembly 28 is held in a fixed vertical position within a suitable aperture formed in a horizontal plate 29 which comprises a portion of the frame for the projector. Each of the bearings 27 and 28 are formed of nylon to assure long life and smoothness of operation of the shaft 26. The shaft 26 is formed with a cross slot 30 at its lower end for projection beneath the bottom of the projector in order to receive a screw driver or a coin so as to rotate the shaft in case the drive mechanism becomes jammed for any reason. A cam assembly 31 is keyed to shaft 26 by means of a pin 32 adapted to be received within a suitable opening in the cam assembly 31. The cam assembly 31 is thus fixed to the shaft 26 and comprises a pair of cams 33 and 34 of the same configuration separated by an intermediate cam 35. The top of cam member 31 comprises a flat surface or disk 36 against which the gear 25 is disposed. An electrical control cam plate member 37 is keyed to the shaft 26 by means of a pin 38 but the key comprising pin 38 permits slight slidable movement of the cam control plate 37 relative to the shaft 26. The lower surface of the cam control plate 37 comprises an annular surface 39 which bears against the top flat surface of gear 25. The surfaces 39 and 36, which bear against the top and bottom surfaces of the gear 25, respectively, form a friction clutch element for effecting a drive connection between rotatable gear 25 and shaft 26. A rather stiff compression spring 40 is disposed between a washer which bears on bearing member 28 and a washer which bears on the top of control cam 37 for effecting a squeezing action against the gear 25 by the two surfaces 36 and 39 in order to effect the clutching engagement therebetween.

The bearing 28 bears on its top side against a collar portion 41 and the collar portion 41 in turn bears against a crank 42 which is likewise keyed to the shaft 26. Thus, rotation of motor shaft 23 is transferred to the gear 25 by means of the worm gear 24 and if the crank 42 is released, then the entire shaft 26 and cam assemblies 31 and 37 and crank 42 rotate with the shaft 26. However, if the crank 42 is held against rotation, there is merely a slipping action between the coacting faces 39 and 36 and the corresponding cooperating faces of the gear 25.

The crank 42 is formed with a pair of stop lugs 43 and 44 on opposite ends thereof which are each adapted to cooperate with a stop lug 45 projecting from the top of armature 22. When the field magnet 21 of motor 12 is energized, the armature 22 is attracted by the field magnet 21 and the stop lug 45 is pulled out of alignment with the crank lugs 43 and 44. It should be borne in mind, however, that the control circuit, which will be described hereinafter, is so designed that the field magnet 21 may be deenergized in order to permit the stop lug 45 to engage either one of the crank lugs 43 and 44 during the appropriate times during the cycle of operation of the projector.

Figure 5:
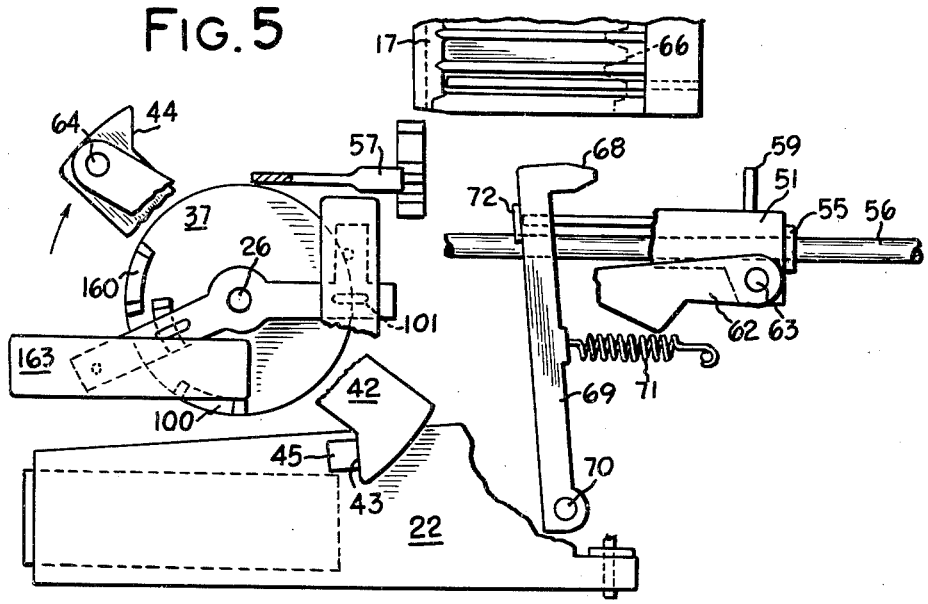
FIG. 5 is a fragmentary view of the mechanism for moving a slide from load position to projection position but showing the different parts of this mechanism in the condition in which they are disposed while the slide is still in loading position.

The mechanism for moving the slides disposed in the slide tray 17 will now be described. The slide tray holder 16 comprises a box-like member open at both ends and bisected by a slot 50 for enabling slide moving mechanism 51 to effect movement of a slide 52, disposed between partitions 53 of slide tray 17, from its position between said partitions 53 in tray 17 (load position of the slide 52) into projection position designated in FIGS. 6 and 7 by reference numeral 54. The slide moving mechanism 51 is mounted for longitudinal sliding movement by means of a pair of bearing portions 55 on a transverse rod 56 which is suitably rigidly mounted in the projector frame. The slide moving mechanism 51 includes a first arm 57 adapted to engage the slide 52 disposed in loading position upon movement of the slide moving mechanism 51 from the position shown in FIG. 5 to the position shown in FIG. 6 or FIG. 7. The slide moving mechanism 51 also includes a second arm 58 formed with a slide pushing pad 59 thereon adapted to engage the slide 52, when in projection position 54, in order to return the slide 52 to its load position within the slide tray 17. The slide moving means 51 also includes a horizontal extension 60 on the bottom of arm 58 and which is formed with a cam 61 for actuating the tray stop means to be described hereinafter.

The slide moving means 51 is operably interconnected with crank 42 by means of a link 62, the link 62 being pivotally interconnected with the slide moving means 51 by means of a pivot 63 and pivotally interconnected with the end of crank 42 which carries stop lug 44 by means of a pivot 64. Thus, upon rotation of crank 42, the slide moving means 51 is reciprocated along rod 56 from the position shown in FIG. 1 (the loading position) to the position shown in FIG. 6. At the same time, the projection 57 on the slide moving means 51 engages the slide 52 and moves it to projection position. During the second half revolution of the crank 42, the pad 59 on the slide moving means 51 engages the opposite side of the slide 52 and returns the same from projection position 54 to loading position in the slide tray 17.

The slide tray 17 includes a pair of toothed rack members 65 and 66, the rack member 65 cooperating with a pinion gear 67 in order to slidably move the tray 17 either forwardly or reversely and the rack member 66 being adapted to be engaged by a stop lug 68 formed on the end of a stop lever 69 which is pivotally mounted at 70 beneath base plate 10. The stop lever 69 is normally biased in a clockwise direction (see FIGS. 5–8) by means of a tension spring 71 operably disposed between the stop lever 69 and a fastening point on the bottom of base plate 10. The stop lever 69 has a downwardly extending projection 72 cooperable with the leading end of horizontal projection 60 disposed at the bottom of slide moving lever 58. When the slide moving lever 58 is moved to the left into the loading position, the leading end of horizontal portion 60 strikes the downwardly extending projection 72 of slide tray lock lever 69 and pivots the lock lever 69 from the position shown in FIGS. 6 or 7 to the position shown in FIG. 8 so as to release the slide tray 17 for longitudinal movement in either direction. When the slide moving means 51 and horizontal portion 60 thereof move to the right in order to transport a slide 52 from load position to projection position, the end of horizontal projection 60 retracts from lug 72 and the tension spring 71 is effective to pivot the lever 69 clockwise, as viewed in FIGS. 5–8, to enable the toothed end 68 of lever 69 to seat itself between adjacent teeth formed on the lower rack member 66 on slide tray 17. This is effective to lock the slide tray 17 in a fixed longitudinal position so as to prevent movement thereof while the slide 52 is disposed in projection position. This locking action takes place before changer arm tip 57 enters the slide tray, to insure line-up of tray with respect to changer arm.

Figures 15, 16:
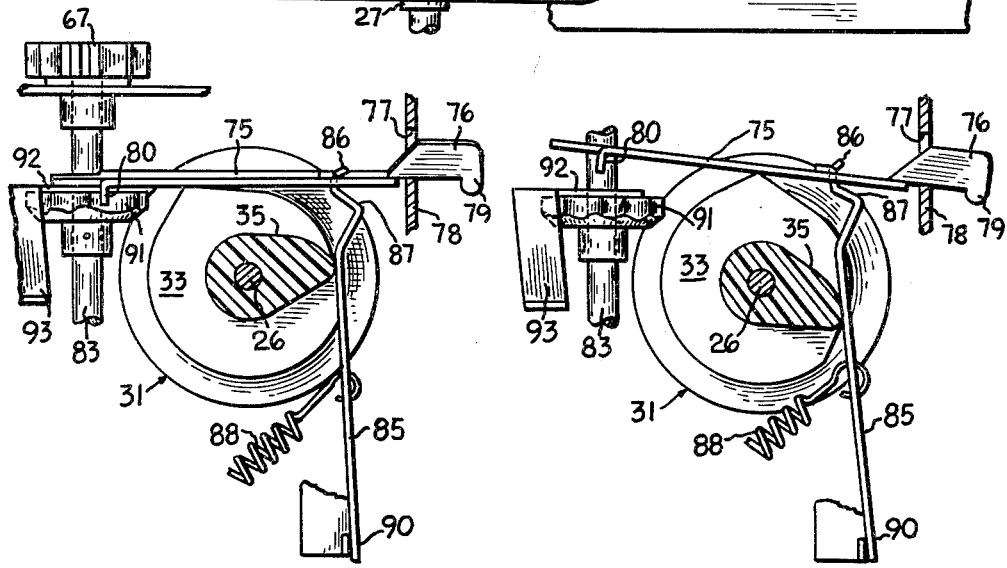
FIG. 15 is a fragmentary view illustrating the slide tray stepping actuating cams and operating mechanism when conditioned for a forward stepping operation at the conclusion of the stepping operation.
FIG. 16 is a view similar to FIG. 15 but illustrating the slide tray stepping mechanism at the point in its operating cycle when the stepping mechanism is being returned.

The mechanical mechanism for effecting the step by step movement of the slide tray immediately following the movement of a slide from projection position to loading position will now be described. This slide tray stepping mechanism comprises a pawl or dog lever or member 75 which is formed with a right-angled projection 76 that extends through a narrow slot 77 formed in a portion of an upstanding member 78 which is rigidly secured to the base plate 10. A projecting lug 79 functions to prevent the dog 75 from being withdrawn from the slot 77. The dog 75 is substantially flat, as indicated in the drawings, and is formed with a pair of pawl or dog-like projections 80 and 81 on the end opposite projection 76 and with an intermediate elongate slot 82 disposed between dog projections 80 and 81. The slot 82 is for receiving a shaft 83 therethrough and the slot 82 permits relative longitudinal movement of the dog 75 with respect to the shaft 83. The dog 75 is formed with a slot 84 therein and the end of a lever 85 projects through said slot 84 and is clinched over at 86 to insure that the relative interconnection between lever 85 and dog 75 will be substantially fixed. A tension spring 88 operably interconnected between the lever 85 and an upstanding portion of the projector frame 89 continually biases lever 85 in a counterclockwise direction about its pivotally and slidably mounted end 90, so as to continuously retain the lever 85 against control cam 35 of cam assembly 31. It will be noted that the dog 75 is wide enough to bridge the gap between the two identical control cams 33 and 34 and it is held against these cams by the action of tension spring 88 which simultaneously pulls the lever 85 to the left as viewed in FIGS. 15 or 16 and pulls the dog 75 about its end 76 into continuous engagement with cams 33 and 34.

A toothed or ratched-like member 91 is keyed to shaft 83 and a blocker member 92 is positioned between the dog projections 80 and 81 and the toothed member 91. The blocker member 92 comprises a projection on the end of a link 93 which is pivotally secured to a projecting arm 94, as indicated at 95, and which arm 94 is rigidly connected to armature 22, as by welding or any other desired means. The blocker member 92 is formed with a generally vertically extending slot 96 adapted for receiving shaft 83 therethrough. Upon energization of field magnet 21, so as to attract armature 22, the blocker member 92 is lowered until the lower portion thereof is disposed in blocking alignment with dog projection 81. Upon deenergization of the field magnet 21, so that the armature 22 is released the blocker member 92 is raised so that the upper portion thereof is disposed in alignment with the dog projection 80 on dog member 75.

Figure 8:
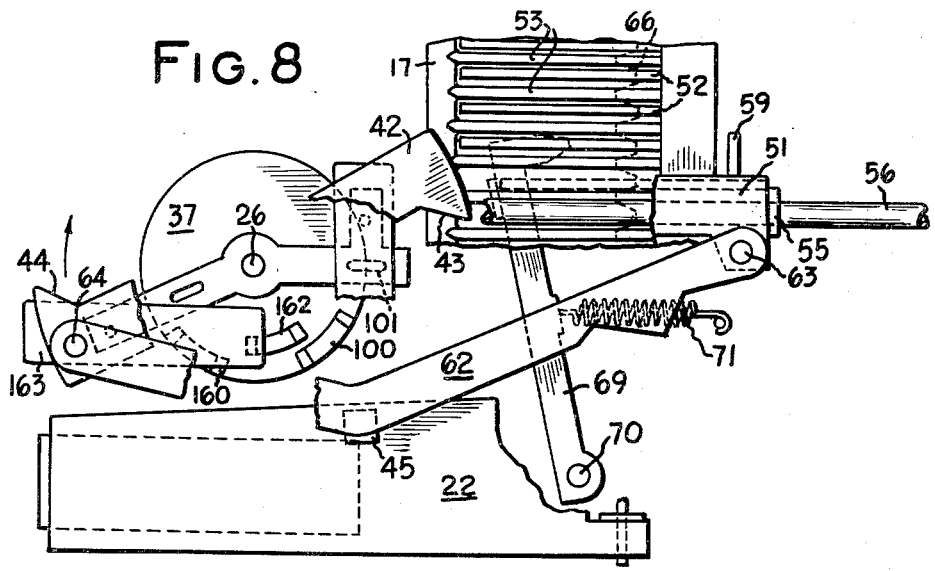
FIG. 8 is a fragmentary view illustrating substantially the same elements as were shown in FIG. 5 but showing the slide moving mechanism in the position wherein the slide tray is just commencing its forward index cycle.

During the cycle of operation of the slide moving means 51, and at a point in the cycle just prior to the conditions illustrated in FIG. 8, control cam portion 100 is effective to open projection limit switch 101 for a short time interval, as designated by reference numeral 102 in FIG. 24. At this time, the momentum of electric motor 12 is sufficient to cause the same to be driven until cam 100 drops off and enables the reclosure of projection limit switch 101. However, during this brief interval 102 when the projection limit switch 101 is opened, the field magnet 21 of motor 12 becomes deenergized and the armature 22 is withdrawn. This has the effect of raising blocker member 92 to bring the upper portion thereof opposite projection dog 80 and to raise the lower portion of blocker member 92 from its position opposite the lower projection dog 81. At this same time, the low points on cams 33 and 34 are opposite dog member 75 and this enables tension spring 88 to draw the dog projections 80 and 81 toward the blocker member 92. The blocker member 92 thus being in a position to block projection 80 enables the lower projection 81 to slip under blocker member 92 into a position between two adjacent teeth on toothed member 91. Immediately thereafter, the high point of cam 35 engages the lever 85 and moves the dog 75 to the right as viewed in FIG. 15 and, due to the coaction between projection 81 and one of the teeth on toothed member 91, the toothed member 91 and shaft 83 are rotated in a direction for effecting forward movement of slide tray 17 by an amount equal to the distance between two adjacent slides. The movement of the toother member 91 is transmitted to the slide tray 17 by means of the gear member 67 which is also keyed to shaft 83. A suitable spring detent 103 is provided for stopping the gear 67 and slide tray 17 in the desired position, but still permitting movement of the slide tray and rotation of the gear when actuated by the stepping mechanism or manually moved.

Figure 14:
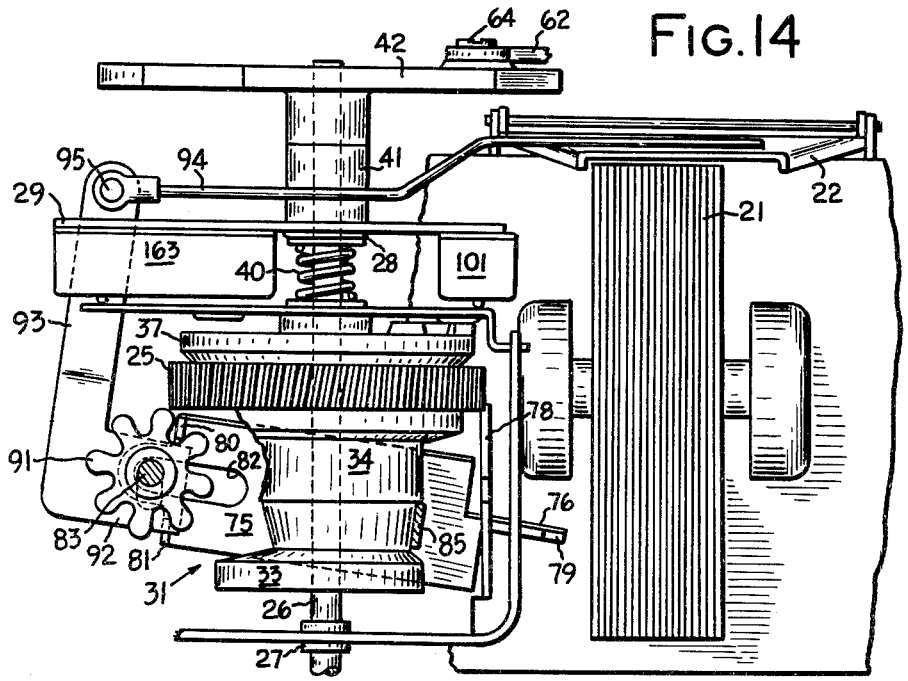
FIG. 14 is a view similar to FIG. 13 and illustrating the slide indexing mechanism at the conclusion of reverse indexing of the slide tray.

A manual control switch 104 or a remote control switch 105 are provided for completing an energizing circuit temporarily for the drive motor 12 under certain conditions of operation of the slide projector disclosed herein and when the slide projector is operating, if it becomes desirable to have a repeat showing of a particular slide which has just previously been shown, all that is necessary to be done in order to accomplish this function is to either manually close the manual switch 104 or the remote control switch 105 for a long enough interval of time to bridge the interval 102 when the projection limit switch 101 is normally opened by control cam 100. Under this condition, the field magnet 21 of drive motor 12 is not deenergized and the armature 22 remains attracted by the field magnet 21 so that the blocker member 92 remains in its lower position, wherein it is free to block projection dog 81 and to permit projection dog 80 to become engaged between two teeth on the toothed element 91. The subsequent action of cam 35 in moving lever 85 is effective to cause projection 80 on dog member 75 to move the toothed member 91 and gear 67 clockwise one step in order to effect a reverse movement of the slide tray 17 and thus bring the next reversely positioned slide into loading position in the tray. FIG. 14 shows the position of the stepping dog member 75 just after it has completed moving the toothed member reversely one step. FIGS. 13 and 17 show the position of the stepping mechanism when it is conditioned for stepping the slide tray forwardly one step. It should be pointed out at this point that when a slide 52 is disposed in projection position with the image thereof being projected onto a viewing screen, all that is necessary to step the slide tray to the next forward position so as to bring the next successive slide into projection position is to manually close either the manual switch 104 or the remote control switch 105 for a very short interval of time. This is sufficient to complete the energizing circuit for drive motor 12 so that the field magnet 21 retracts armature 22 and withdraws stop lug 45 from engagement with stop lug 44 on crank 42 and the motor 12 will function with the normal slight interruption of power during interval 102. If, however, it is desired to reverse the slide tray so as to bring a previous slide back into viewing position, all that is necessary to do is to manually close the manual switch 104 or the remote control switch 105 for a slightly longer interval of time so as to complete the energization of the motor 12 during the interval 102. Under these conditions, as previously described, the slide stepping operation is effective to reversely step the slide tray 17 by one step to bring the next successive reversely positioned slide into load position.

As stated earlier in the present specification, the slide projector comprising the subject matter of the present invention includes a shutter mechanism 20 which functions to prevent the projection of light rays onto the viewing screen during the interval when a slide changing operation is taking place. The shutter mechanism 20 is of more or less conventional construction and comprises a flat shutter plate 110 which is mounted for pivotal movement at 111. When the shutter plate 110 is disposed in the position shown in FIG. 6, it is effective to block the passage of light from projection lamp 13 through a slide 52 disposed in projection position 54. When the shutter plate 110 is in the position shown in FIG. 7, the lamp is effective to project an image of a slide 52 disposed in projection position 54 onto a viewing screen.

Figure 6:
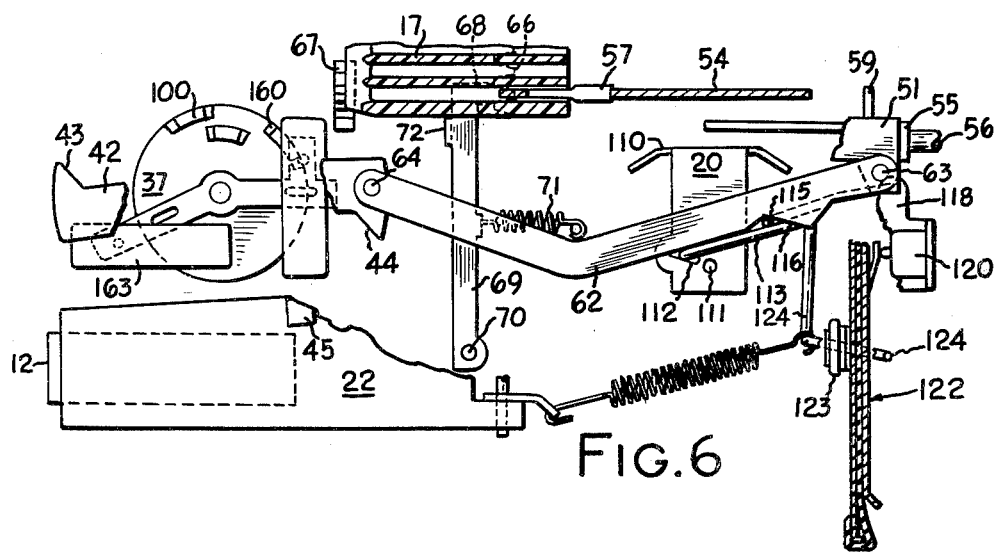
FIG. 6 is a view somewhat similar to FIG. 5 but showing the elements on a slightly smaller scale and showing certain additional elements under the conditions at the point in the cycle of operation when the slide has just been moved to projection position.
Figure 7:
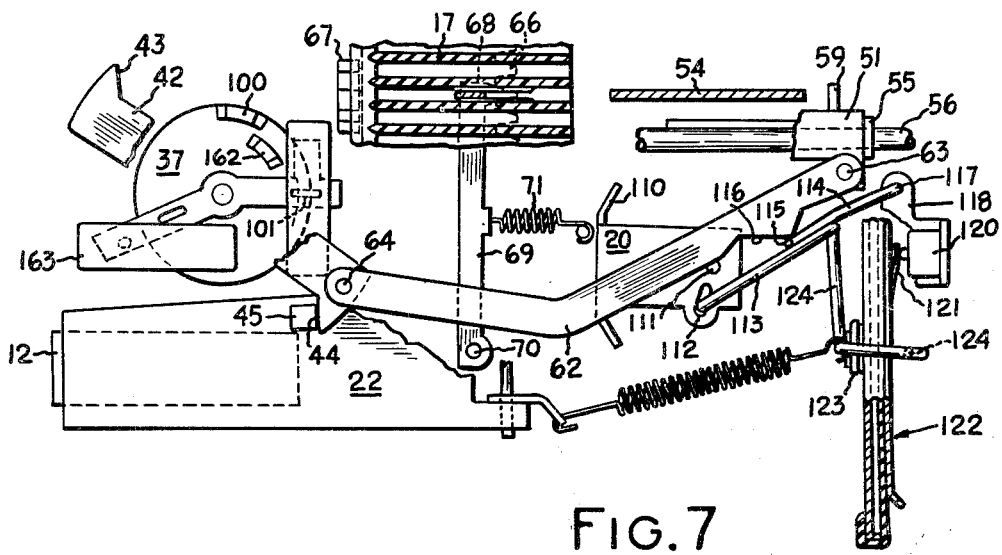
FIG. 7 is a view similar to FIG. 6 and illustrating the position of the slide moving mechanism at that point in the cycle where the shutter mechanism has opened in order to enable the projection of the image from the slide onto the viewing screen.

The mechanism for controlling the operation of the shutter 20 is operated in time sequence with the slide moving mechanism 51 and will now be described. The shutter 20 is formed with an elongate slot 112 through which a downwardly extending projection (not numbered) on the end of a rod 113 projects. The rod 113 is welded or soldered to a second rod 114 which is formed with a vertical projection 115 at one end cooperable with a cam surface 116 on link 62 and a vertically extending projection 117 at the other end mounted for pivotal movement with respect to a fixed portion 118 of the slide projector frame. When the slide moving mechanism 51 moves to the right, as when the crank 42 moves from the position shown in FIG. 5 to the position shown in FIG. 6, in order to bring the slide 52 into projection position 54, the peak of cam surface 116 rides past projection 115 on rod 114. Thereafter, the crank 42 rotates from the position shown in FIG. 6 to the position shown in FIG. 7, returning the slide moving mechanism 51 slightly to the left but by an amount insufficient to effect return of the slide 52 from projection position 54. During this return movement of the slide moving mechanism 51, the cam surface 116 pushes downwardly (as viewed in FIG. 7) on projection 115 and this has the effect of pivoting the rods 113 and 114 in a counterclockwise direction about pivot 117 and the opposite end of the rod 113, which is disposed in slot 112 has the effect of moving the shutter 20 from closed position, shown in FIG. 6, to open position, shown in FIG. 7. As soon as the armature 22 is attracted by the field winding 21 of motor 12 in order to return the slide from projection position 54 to loading position, the crank 42 commences rotating in a clockwise direction and the peak of cam surface 116 slides past vertical projection 115 on rod 114. This permits the rods 113 and 114 to pivot clockwise about pivot point 117 so as to return shutter 20 to its closed position, as shown in FIG. 6, thereby preventing what would otherwise be the bright light from lamp 13 on the viewing screen without any picture being projected.

A timer mechanism for controlling the duration that a slide is in projection position and its image projected upon a viewing screen is provided, and this timer mechanism will now be described. The timer mechanism is closely associated with the shutter 20 inasmuch as a portion of the same linkage which actuates the shutter is also utilized for actuating the timer mechanism.

The timer mechanism comprises a timer switch 120 which preferably consists of a microswitch actuated by means of an adjusting lug on a pivoted plate 121 controlled by a bellows 122. The timer switch 120 is normally open and when the bellows 122 is blown up sufficiently it is capable of actuating the lug 121 in order to close the timer switch 120. The bellows 122 includes a relief valve 123 which is normally open except when a slide 52 is disposed in projection position 54. Under these conditions, an extension 124 on rod 113 is effective, when the slide 52 is disposed in projection position with the shutter 20 open, to close the valve 123 and move a projection 124 from engagement with the opposite side of bellows 122.

Means for blowing up the bellows 122 when a slide 52 is in projection position 54 will now be described. This means comprises a blower motor 19 which actuates the fan 18. An airduct 125 which is in communication with the bellows 122 is adapted to have air blown thereinto by means of the fan 18 through a valve assembly 126. The valve assembly includes an entrance 127 and a needle control valve 128 manually controllable by means of a threaded shaft actuated by a control button 129. When it is desired to increase the duration of time during which a slide is projected, the button 129 is turned in order to close off the valve 126 and minimize the supply of air to the bellows 122 through ducts 127 and 125. If it is desired to decrease the time interval for which a slide is projected upon the screen, the valve 126 is merely opened.

After the bellows is blown up sufficiently to actuate timer switch 120, the motor 12 is actuated to effect a return of the slide 52 from projection position 54. At this time the valve 123 is opened and arm 124 deflates the bellows 122 under spring pressure.

The air pressure provided by the fan 18 blows against the slide in projection position and is effective to hold it in the proper position.

The projection lens assembly 15 is easily adjustable in order to facilitate focusing the image on the viewing screen. A pair of nylon rollers 130 are disposed on top of the projection lens assembly 15 and a friction covered roller (not shown) disposed beneath the projection lens assembly 15 and actuated by a manually controlled knob may be provided for facilitating adjustment of the lens assembly.

Under certain conditions of operation, a slide 52 disposed in projection position 54 may be improperly disposed for providing satisfactory projection. Under such circumstances, it may be desirable to remove the slide. For this purpose, an edit lever 131 (see FIG. 4) is provided, which edit lever 131 is pivotally mounted in the projector frame at 132 and is provided with a manually depressible knob 133 which extends to the outside of the projector. At the opposite end of the edit lever 131, there is a vertical projection 134 disposed beneath a slide 52 when the latter is positioned in projection position. By merely depressing the edit lever 133, the other end of the lever 131 is caused to raise so as to contact the slide 52 in projection position and raise the same upwardly where it can be grasped manually by the operator's other hand. The slide may then be repositioned properly in the projector and viewing may proceed accordingly after the selector switch is returned to its "operate" position.

The slide projector comprising the subject matter of the present invention also comprises a new and improved tray stop mechanism and tray controlled switch, all of which is shown in FIGS. 20–23. This tray stop mechanism and tray controlled switch will now be described.

Figure 25:
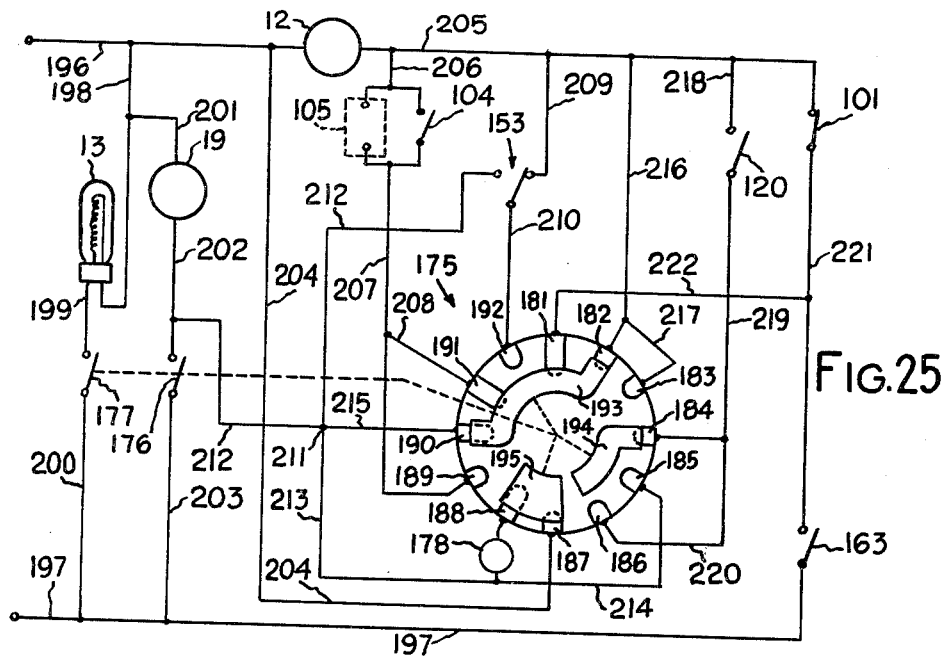
FIG. 25 is a schematic illustration of the electrical control circuit utilized for controlling the slide projector comprising the subject matter of the present invention with said circuit being in that condition of operation when the selector switch is in its "off" position and with either no slide tray in the tray holder or with the slide tray in engagement with the stop mechanism.
Figure 26:
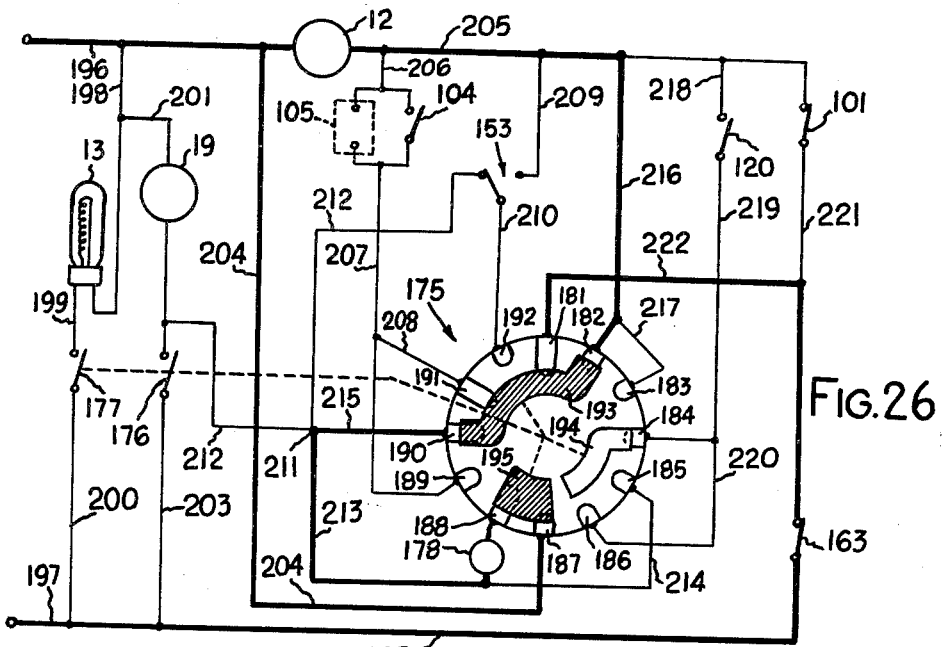
FIG. 26 is a view illustrating the condition of operation of the electrical control circuit when the selector switch is in its "off" position but a slide is in other than loading position.
Figure 28:
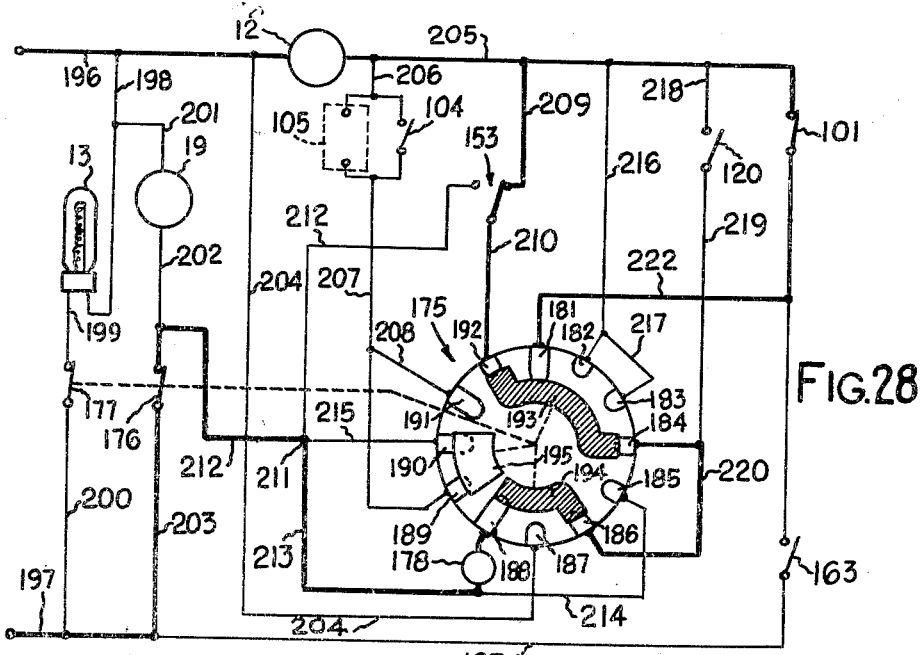
FIG. 28 is a view of the electrical control circuit when the selector switch is disposed in its "operate" position and a slide tray is disposed in the slide tray holder.
Figure 29:
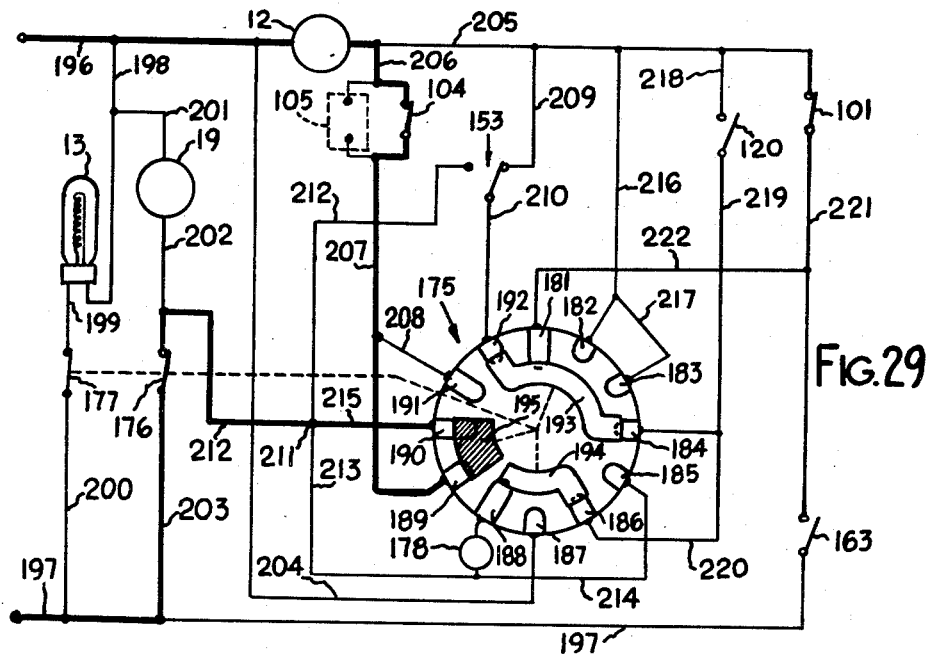
FIG. 29 is a view of the electrical control circuit when the selector switch is disposed in its "operate" position but at that moment in the cycle of operation when the manual control switch is closed in order to actuate the driving motor.

The tray stop mechanism includes an elongate bar member 140 which comprises a substantially flat end portion 141 disposed for pivotal and sliding movement within a slot 142 formed in a downwardly extending portion 143 of the slide projector frame. The stop mechanism 140 is bent at substantially right angles at 144 and is cut out as indicated at 145 to form an upstanding tab 146. The upstanding tab 146 is flat across its left side and comprises a lug portion 147 and a cam portion 148. The upstanding tab 146 is adapted to project through an opening 149 in the bottom of slide tray holder 16 and to be abutted by the leading edge of slide tray 17 when the same is pushed forwardly into its starting position (see FIG. 20). The opening 149 is formed with an abutment shoulder 150 against which the flat portion 147 abuts and is open slightly further in that area where the cam portion 148 extends through the opening 149. The stop member 140 is provided with a portion 151 which is adapted to cooperate with the cam 61 formed on the bottom of slide moving lever 58. The opposite end of the stop member 140 comprises a generally elongate flat portion 152 which is cooperable with a tray switch 153 in order to control the operation thereof. The schematic circuit arrangement for the tray switch 153 is disclosed in FIGS. 25–34 and when the slide trap 17 is either in the position shown in FIG. 20 or there is no slide tray in the projector, the tray switch blade will occupy its out position, as shown in FIGS. 25, 28 and 29. When the slide tray is in operative position in the projector, the tray switch will occupy its in position as disclosed in FIGS. 26, 27 and FIGS. 30–34. A tension spring 154 serves to constantly urge the stop member 140 upwardly and to the left in order to bring the tab means 146 through the opening 149.

By providing the substantially flat back surface or abutment surface on the tab 146, it is possible to push the slide tray 17 into the slide projector and insure that it is accurately positioned for the starting of operation of the projector. It sometimes occurs that after a tray of slides will be completed and withdrawn from the projector or for some other reason it may be that only a certain group of slides may be desired to be shown from a tray, it is only necessary, in such a case, to insert the tray backwardly into the tray holder 16 and the cam surface 148 will function to enable the tray to depress the stop lever 140 and permit the insertion of the tray in a rearward direction as shown in FIG. 22.

When the cam 61 operates to move the stop lever 140 from the position shown in FIG. 20 to the position shown in FIG. 21 sometimes the stop lever will be forced downwardly with some considerable force. The projection 155 comprising a portion that is cut out to form opening 149 projects through opening 145 in the stop lever 140 and insures that the stop lever 140 will not be moved laterally to an inoperative position.

The control cam assembly 37 on the main shaft 26 includes in addition to cam 100 for actuating the projection limit switch 101, a second cam 160 which also controls the projection limit switch 101 and functions to open the projection limit switch 101 during the interval represented by reference numeral 161 in FIG. 24, which interval occurs when the slide 52 is disposed in its project position. The control cam assembly 37 also includes a cam 162 disposed slightly inwardly from cams 100 and 160 and for the purpose of controlling a load limit switch 163. The load limit switch 163 is open during the interval represented by reference numeral 164 in FIG. 24 which occurs while the slide 52 is disposed in load position. A pair of spring fingers 165 and 166 are respectively formed with cam follower portions 167 and 168 which ride the top surface of cam control member 37 and are adapted to be engaged by cams 100, 160 and 162 respectively and when engaged by the cams function to open the projection limit switch 101 and the load limit switch 163 respectively.

The electric control circuit for controlling the operation of the slide projector comprising the subject matter hereof will now be described. Reference should be had particularly to FIGS. 25–34. In addition to the switches 101, 104, 105, 120, 153 and 163 and the lamp 13, blower motor 19 and drive motor 12, the control circuit also includes a selector switch indicated generally by reference numeral 175 and a pair of switches 176 and 177 which are moved to closed position whenever the selector switch 175 is moved to any position other than its "off" position. The control circuit also includes a panel lamp 178.

The selector switch 175 comprises a plurality of peripheral contacts 181–192. It will be noted that the peripheral contacts 182, 183, 184, 185, 186, 187, 189 and 192 are each short whereas peripheral contacts 181, 188, 190 and 191 are longer. The selector switch 175 also includes a rotatable mechanism including contact blades 193, 194 and 195. The central portion of contact blade 193 is short so as to be able to engage only the longer peripheral contacts whereas both ends of the contact member 193 are long for engaging the short as well as the long peripheral contacts. Contact member 195 is capable of engaging either short or long contact members in any position of its movement whereas contact member 194 is short except for a long portion at one end.

The electric circuit shown in FIGS. 25–34 comprises a pair of leads 196 and 197 which are respectively adapted to be connected with a source of 60-cycle alternating current. An energizing circuit for lamp 13 extends from lead 196, over a lead 198, through lamp 13, over a lead 199, switch 177, and lead 200 to lead 197. An energizing circuit for blower motor 19 may be established from lead 196, over lead 198, over lead 201, over lead 202, and over lead 203 to lead 197. The lead 196 is directly connected with the driving motor 12 and it is also connected with selector peripheral contact 187 by means of a lead 204. A lead 205 extends from the other terminal of driving motor 12 and is connected to manual switch 104 and remote control switch 105 by means of a lead 206. The manual switch 104 and remote control switch 105 are each connected with selector peripheral contact 189 over lead 207 and with peripheral selector contact 191 over leads 207 and 208. Lead 205 is connected with the out contact of tray switch 153 over a lead 209 and the movable contact terminal of tray switch 153 is directly connected with selector switch peripheral contact 192 over a lead 210. The in terminal of tray switch 153 is connected with a terminal point 211 by means of a lead 212 and the terminal point 211 is connected with lead 202 over a conductor 212, panel lamp 178 and selector switch peripheral contact 185 over conductors 213 and 214 respectively and with selector switch peripheral contact 190 over a conductor 215.

Conductor 205 is connected with selector switch terminal contacts 182 and 183 by means of leads 216 and 217 respectively. A lead 218 connects conductor 205 with timer switch 120 and the latter is connected with selector switch terminal contacts 184 and 186 by means of a pair of leads 219 and 220. The lead 221 interconnects the projection limit switch with the load limit switch 163, the latter being directly connected with lead 197. Finally, a lead 222 interconnects selector switch terminal contact 181 and conductor 221.

FIG. 25 shows the "off" condition of the electrical control circuit with the selector switch 175 disposed in the condition shown and with switches 176 and 177 which are controlled in accordance with the position of the selector switch 175 also both in the open condition. Under these circumstances, the switch 177, being open, makes it impossible for an energizing circuit to be completed for projection lamp 13, and switches 176 and 163 being open makes it impossible for an energizing circuit to be completed for the blower motor 19. Likewise, since load limit switch 163 is open at this time, the drive motor 12 may not be energized.

If the selector switch 175 is turned to its off position (see FIG. 26) and the slide moving means 51 is not in its load position, the load limit switch 163 will be closed. Therefore, under these circumstances, the driving motor 12 will be energized over a circuit extending from lead 205, over lead 216, contact 182, contact 193, contact 181, lead 222, and lead 221 through load limit switch 163 to lead 197. This circuit, however, will be closed only until the driving motor 12 causes the crank 42 and the slide moving mechanism 51 to be returned to its loading position, at which time, the load limit switch 163 opens and the energizing circuit for the driving motor 12 is no longer completed. Under these circumstances and for so long as the load limit switch is closed during the interval while the driving motor is returning the slide moving mechanism to its load position, an energizing circuit is established for the panel lamp 178 which extends from lead 196, over lead 204, through contacts 187, 195 and 188, through panel lamp 178 over lead 213, through terminal 211, over lead 215, contacts 190, 193 and 181, lead 222, lead 221, through load limit switch 163 to lead 197. This last circuit also remains energized only for so long as the slide moving means is returning to its loading position. After the slide moving means 51 has returned to its load position, the condition of the circuit will be as shown in FIG. 25.

Figure 27:
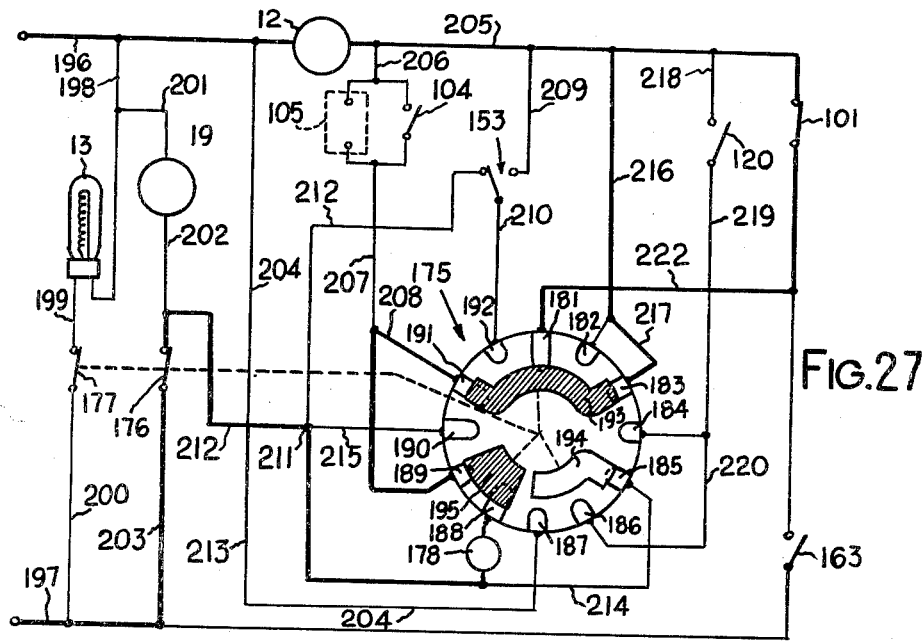
FIG. 27 is a view illustrating the condition of the electrical control circuit when the selector switch is disposed in its "tray release" position.

When the selector switch 175 is turned to its "tray release" position, as indicated in FIG. 27, energizing circuits will be established for the projector lamp 13 and blower motor 19 and an energizing circuit will be established for the panel lamp 178. Similarly, an energizing circuit will be established for the driving motor 12 for that interval of time necessary for the driving motor to move the slide moving mechanism 51 from its projection position to its load position, whereupon the driving motor 12 will stop as the load limit switch 163 will then open. Under these conditions, the energizing circuit for the projection lamp 13 extends from lead 196, over lead 198, through projection lamp 13, over lead 199 through closed switch 177, and over lead 200 to lead 197. The energizing circuit for the blower motor 19 extends from lead 196, over leads 198 and 201, through blower motor 19, over lead 202, through closed switch 176, over lead 203 to lead 197. The temporary energizing circuit for driving motor 12 extends from lead 196 through driving motor 12, over lead 205, over leads 216 and 217, through contacts 183, 193 and 181, over lead 222, over lead 221, through temporarily closed load limit switch 163 and to the lead 197. Upon the opening of load limit switch 163 as soon as the slide moving means returns to load position, the energizing circuit for the driving motor 12 will be broken. The energizing circuit for the panel lamp 178 extends from lead 196, through driving motor 12, over lead 205, and either through leads 216 and 217 and contact 183 to contact 193 or over lead 221, 222, and contact 181 and from the contact 193, through contact 191 over leads 208 and 207, contact 189, 195 and 188, through panel lamp 178, over lead 213, through terminal 211, over lead 212, over lead 202 through closed switch 176 and over lead 203 to lead 197.

When the selector switch 175 is moved to its "operate" position and there is no tray in the tray holder 16 or the tray 17 occupies the position shown in FIG. 20 so that the tray switch 153 is against its out contact, the condition of the circuits is as shown in FIG. 28. At this time, the usual energizing circuits for the lamp 13 and the blower motor 19 are completed and an energizing circuit for the panel lamp 178 is completed. The panel lamp energizing circuit 178 extends from lead 196, through driving motor 12, over lead 205 and from lead 205 to contact 193 either through projection limit switch 101, leads 221 and 222, and contact 181, or through lead 209, out contact of tray switch 153, lead 210 and contact 192 and thence through contact 193, contact 184, over lead 220, through contacts 186, 194 and 188, through panel lamp 178 over lead 213, through terminal 211, over lead 212 and lead 202, through closed switch 176 and over lead 203 to lead 197. The driving motor is not energized upon the completion of the immediately aforementioned circuit because of the relatively high resistance of the panel lamp 178, which prevents sufficient current flow to actuate the driving motor 12. Actually, this condition prevails whenever the panel lamp 178 is energized through the driving motor 12.

Figure 30:
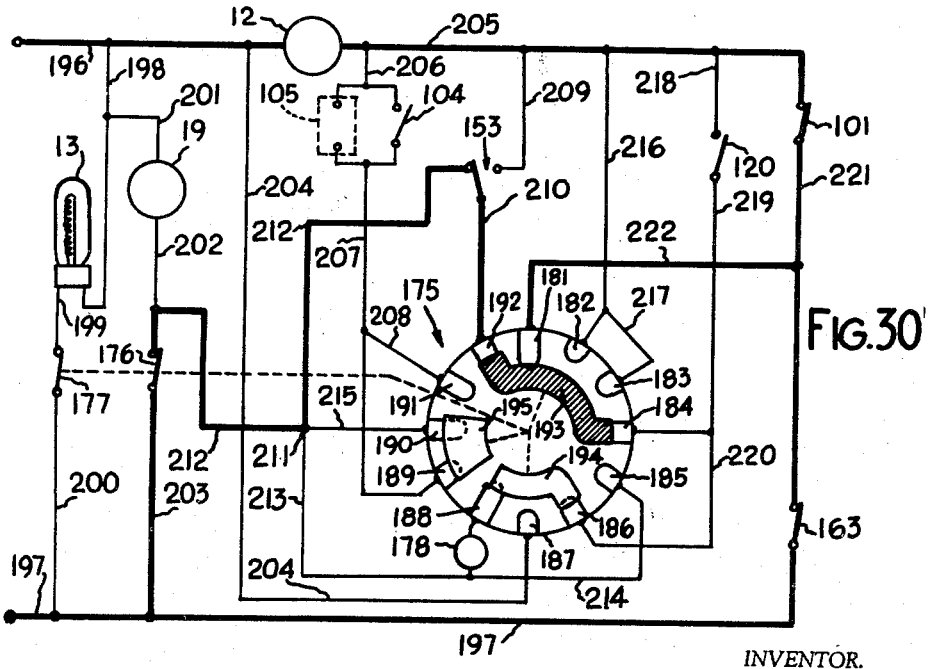
FIG. 30 is a view illustrating the electrical control circuit with the selector switch disposed in its "operate" position and illustrating the condition of operation at the release of the manual control switch and after the tray switch has been moved from its out to its in position.

FIG. 29 discloses the condition of operation of the control circuit with the slide tray 17 disposed in the position shown in FIG. 20, that is, with the first slide therein in loading position and at that interval when either the manual switch 104 or the remote control switch 105 is closed. Under these conditions, the projection lamp 13 is energized and the blower motor 19 is energized over their usual circuits, but a circuit is completed to the driving motor 12 which extends from lead 196, through driving motor 12, over leads 205 and 206, through either remote control switch 105 or manual switch 104, over lead 207, through contacts 189, 195 and 190, over lead 215, terminal 211, leads 212 and 202, closed switch 176 and over lead 203 to lead 197. The condition of operation as disclosed in FIG. 29 is only temporary as it will be recalled that the manual switch 104 or remote control switch 105 is only closed momentarily. Immediately after this closure the slide moving mechanism 51 commences its motion and the cam 61 is effective to actuate stop bar 140 so as to throw the tray switch from its out position to its in position. During this same movement of the slide changing mechanism 51, the load limit switch 168 is closed so that a new energizing circuit for the driving motor 12 is completed which is shown in FIG. 30 and which extends from lead 196, through driving motor 12, over lead 205, through closed projection limit switch 101, and lead 221 to lead 197 either through closed limit switch or over a path which extends over lead 221, through contacts 181, 193 and 192, leads 210, in the in contact of tray switch 153, lead 212, terminal 211, lead 212, lead 202, closed switch 176, and lead 203 to lead 197.

Figure 31:
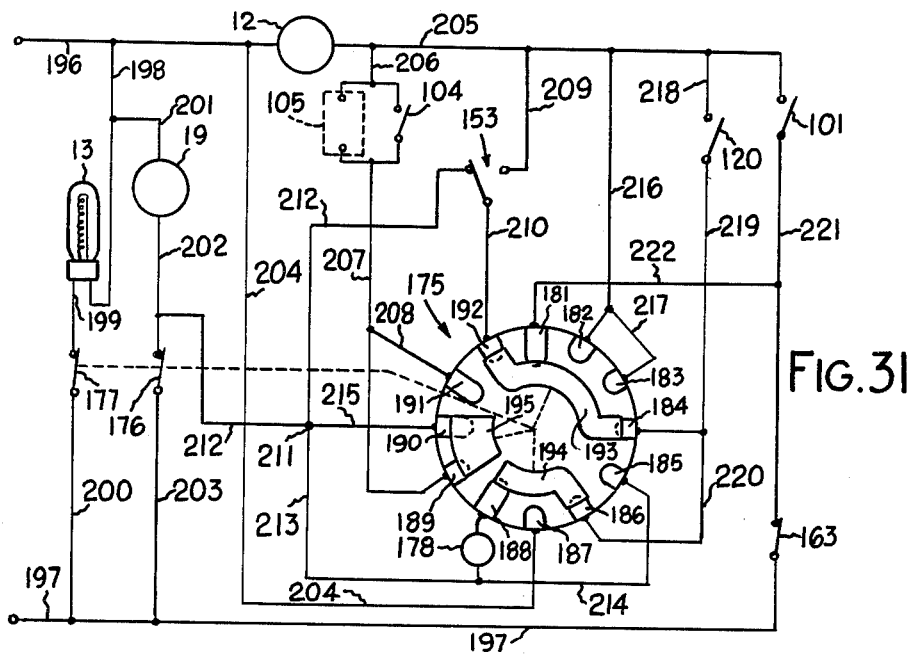
FIG. 31 is a view illustrating the electrical control circuit with the selector switch disposed in its "operate" position but with the automatic timer switch not yet closed.

FIG. 31 discloses the condition of the circuits after the slide 52 has moved into projection position 54, but before the timer switch 120 has closed. Under these conditions, only the projection lamp 13 and blower motor 19 are energized. All of the other circuits are open.

Figure 32:
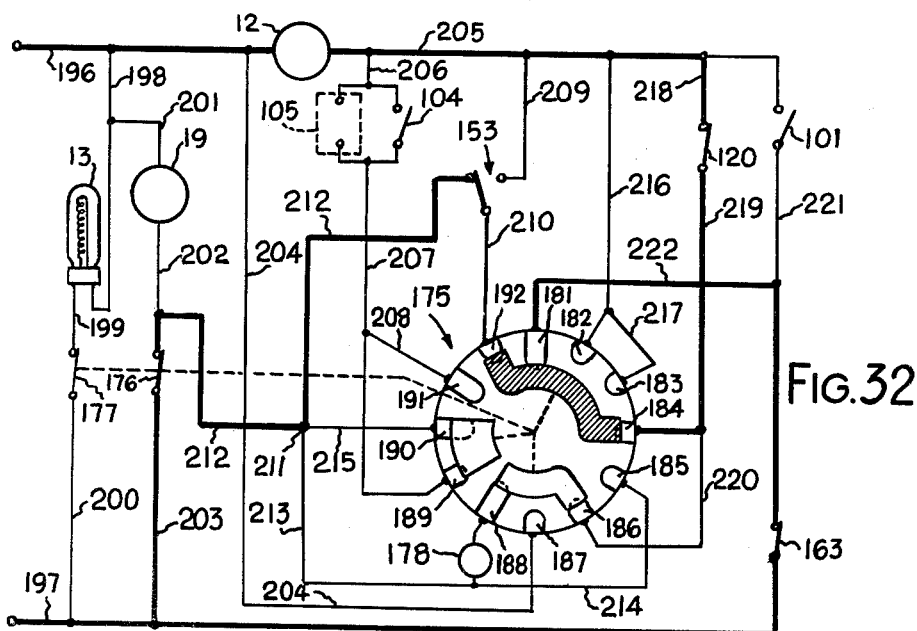
FIG. 32 is a view illustrating the electrical control circuit with the selector switch disposed in its "operate" position and with the timer switch closed so as to start the driving motor in order to return a slide from project position to load position.

After a predetermined interval of time, as determined by the condition of timer switch control button 129, the timer switch 120 closes and an energizing circuit for the drive motor 12 is established which is effective to start the operation of the motor and return the slide moving mechanism from its projection position to its loading position. The energizing circuit for the driving motor 12 which is actuated by the closure of timer switch 120 is shown in FIG. 32 and extends from lead 196, through driving motor 12, over lead 205, lead 218, closed switch 120, lead 219, contacts 184, 193, and to lead 197 either through contact 181, lead 222, lead 221, closed load limit switch 163, to lead 197 or through contact 192, lead 210, the in terminal of tray switch 152, lead 212, terminal 211, lead 212, lead 202, closed switch 176, and lead 203 to lead 197. The timer switch 120 remains closed only for a very short interval of time, because as soon as the slide moving mechanism 51 commences its return from projection position, the valve 123 is allowed to open to let the air rush out of the bellows 122 and open the timer switch 120. However, at the time that this occurs, the driving motor 12 will have rotated the crank 42 sufficiently so that the projection limit switch 101 will have been closed between the intervals 161 and 102, thus establishing a circuit from lead 205 to lead 197 through the projection limit switch 101 and lead 221 which is in parallel with the timer switch 120. It will be noted that even though the projection limit switch 101 opens for the short interval 102, as shown in FIG. 24, the motor 12 has sufficient momentum to enable the mechanism to coast until the projection limit switch is again closed in order to enable the motor to complete the cycle of operation of the slide changing means 51. Thus, the slide changing means 51 will be returned to its load position which is exemplified by the condition of the circuits disclosed in FIG. 33.

With reference now to FIG. 33, the slide 52 will be in load position and the projection lamp 13 and blower motor 19 will be actuated over their usual energizing circuits. The driving motor 12 will continue to operate as it is energized over a circuit extending from lead 196 through drive motor 12, through lead 205, through closed projection limit switch 101, over leads 221, and 222, through contacts 181, 193, and 192, over lead 210, through the in terminal of tray switch 153 over lead 212, through terminal 211, over lead 212, lead 202, closed switch 176, and over lead 203 to lead 197. Thus it will be apparent that the driving motor will continue to operate so as to immediately move the next slide into projection position, it being realized that upon return of the slide changing mechanism 51 to its load position, the tray stepping mechanism has functioned to advance the tray one step in a forward direction so as to bring the next forward slide into loading position in condition to be engaged by the slide pusher member 57.

Returning briefly to FIG. 31, it will be apparent that when the slide is in projection position and the timer switch 120 has not yet closed, momentary closure of either the manual switch 104 or the remote control switch 105 will establish an energizing circuit for the drive motor which will extend from lead 196, through drive motor 12, over leads 205 and 206, through either the remote control switch 105 or the manual switch 104, over lead 207, through contacts 189, 195, and 190, over lead 215, through terminal 211, over lead 212, lead 202, closed switch 176 and lead 203 to lead 197. If the manual switch 104 or the remote control switch 105 is retained in a closed condition long enough to bridge the interval 102 while the project limit switch 101 is opened by cam 100 then the tray stepping mechanism will be effective to step the tray reversely one step. However, if the manual switch 104 or the remote control switch 105 is only held closed very shortly or momentarily, then the projection limit switch 101 will be open so as to break the energizing circuit for the driving motor 12 momentarily and instead of a reverse stepping of the tray 17, it will be stepped forwardly one position to advance the next successive forward slide into loading position.

Whenever the projector selector switch 175 is moved to "edit" position, an interlock (not shown) between the selector switch 175 and the edit lever 133 is released so as to permit depression and operation of the edit lever. At this time a slide will stop in the projection position 54. If there is no slide in projection position, an energizing circuit for the driving motor 12 will be established to cause the driving motor 12 to move the slide moving mechanism 51 to its projection position and this circuit will be completed from lead 196, through driving motor 12, over lead 205, through closed projection limit switch 101, over leads 221 and 222, through contacts 181, 193, and 185, over leads 214 and 213, through terminal 211, over lead 212, lead 202, closed switch 176, lead 203 to lead 197. As soon as the slide 52 moves slightly out of its load position, the load limit switch 163 will be closed so that the driving motor circuit may be completed directly through the projection limit switch 101 and the load limit switch 163 until the slide moving mechanism and the slide reaches projection position. At this time, the projection limit switch 101 opens and it is thereafter no longer possible to complete an energizing circuit for the driving motor 12 and it stops in projection position. Thus, FIG. 34 discloses the condition of operation of the circuits when the selector switch 175 is disposed in its "edit" condition. At this time an energizing circuit for the projection lamp 13 and for the blower motor 19 are completed, and likewise an energizing circuit for the panel lamp 178 is completed. The energizing circuit for the panel lamp 178 extends from lead 196 over lead 204, through contacts 187, 194, and 188, through panel lamp 178, to lead 197, either over a circuit including leads 213, terminal 211, lead 212, lead 202, switch 176, and lead 203, or over a circuit including lead 214, contacts 185, 193 and 181, leads 222 and 221, and load limit switch 163 to lead 197.

It is contemplated that numerous changes and modifications may be made in the slide projector comprising the subject matter of the present invention without departing from the spirit or scope of the invention.

What is claimed is:

1. In a slide projector, the combination including a projection lens system for projecting an image from a transparent slide onto a screen, a slide tray normally movable in a step by step manner and thereby being adapted to successively bring transparent slides disposed within the tray into a loading position, a driving motor, means actuated by said motor and effective in timed sequence to move the slide disposed in said loading position into a projection position relative to said lens system and after a predetermined time interval to return such slide to said loading position in said tray; means for effecting said stepped movement of said slide tray and including cooperable dog and toothed means, means comprising a blocking member actuated by said motor upon the return of such slide to loading position for causing a first portion of said dog to engage said toothed means for normally effecting movement of said slide tray into its next forward position, and selectively controlled means actuated by the energization of said motor for actuating said blocking member in a different manner upon the return of said slide to loading position for thereby causing a second portion of said dog to engage said toothed means for effecting movement of said slide tray into its next rearward position.

2. In a slide projector, the combination including a projection lens system for projecting an image from a transparent slide onto a screen, a slide tray normally movable in a step by step manner and thereby being adapted to successively bring transparent slides disposed within the tray into a loading position, a driving motor, means actuated by said motor and effective in timed sequence to move the slide disposed in said loading position into a projection position relative to said lens system and after a predetermined time interval to return such slide to said loading position in said tray, means for effecting said stepped movement of said slide tray and including cooperable dog and toothed means, said dog being slidably and pivotally mounted and adapted to engage said toothed means alternatively on one edge or on the opposite edge, means comprising a blocking member cooperable with said dog for selectively permitting engagement of the latter with one or the other edge of said toothed means, means normally effective to position said blocking member so as to engage said one edge of said toothed means whereby said motor is effective to actuate said dog on the return of such slide to loading position to move said tray into its next forward position, and selectively controlled means effective to override said last-named means and thereby position said blocking member so as to engage said other edge of said toothed means whereby the energization of said motor is effective to actuate said dog on the return of such slide to loading position to move said tray into its next rearward position.

3. In a slide projector, the combination including a projection lens system for projecting an image from a transparent slide onto a screen, a slide tray for receiving a plurality of transparent slides and normally movable in a step by step manner to successively bring the transparent slides disposed within the tray into a loading position, a driving motor, means actuated by said motor and effective in timed sequence to move the slide disposed in said loading position into a projection position relative to said lens system and thereafter to return such slide to said loading position in said tray, means for driving said slide tray in said step by step manner either forwardly or reversely, said driving means including a cooperable rotatable toothed element and a slidably and pivotally mounted driving dog, means actuated by the energization of said motor for selectively controlling the pivotal movement of said driving dog for selectively controlling the mode of coaction thereof with said toothed element, and means driven by said motor upon the return of such slide to loading position for moving said driving dog slidably so as to move said slide tray a step either forwardly or reversely in accordance with the selective control of said driving dog.

4. In a slide projector, the combination including a projection lens system for projecting an image from a transparent slide onto a screen, a slide tray for receiving a plurality of transparent slides and normally movable in a step by step manner to successively bring the transparent slides disposed within the tray into a loading position, a driving motor, means actuated by said motor and effective in timed sequence to move the slide disposed in said loading position into a projection position relative to said lens system and thereafter to return such slide to said loading position in said tray, means for driving said slide tray in said step by step manner either forwardly or reversely, said driving means including a cooperable rotatable toothed element and a slidably and pivotally mounted driving dog, said driving dog having a first tooth effective upon pivotal movement of the dog in a first direction to engage a tooth on one edge of said toothed element and a second tooth effective upon pivotal movement of the dog in the opposite direction to engage a tooth on the opposite edge of said toothed element, selective control means actuated by the energization of said motor for selectively blocking said driving dog teeth such that the latter alternatively engage said toothed element, and cam means driven by said motor for slidably moving said dog upon the return of such slide to loading position and thereby effecting the selected stepped movement of said slide tray so as to position the next successive reverse slide in loading position.

5. In a slide projector, the combination including a projection lens system for projecting an image from a transparent slide onto a screen, a slide tray for receiving a plurality of transparent slides and normally movable in a step by step manner to successively bring the transparent slides disposed within the tray into a loading position, a driving motor, means actuated by said motor and effective in timed sequence to move the slide disposed in said loading position into a projection position relative to said lens system and thereafter to return such slide to said loading position in said tray, means for driving said slide tray in said step by step manner either forwardly or reversely, said driving means including a cooperable rotatable toothed element and a slidably and pivotally mounted driving dog, said driving dog having a first tooth effective upon pivotal movement of the dog in a first direction to engage a tooth on one edge of said toothed element and a second tooth effective upon pivotal movement of the dog in the opposite direction to engage a tooth on the opposite edge of said toothed element, a blocker member selectively positionable by the energization of said motor to selectively block said driving dog teeth from engagement with said toothed element, and cam means driven by said motor for slidably moving said dog upon the return of such slide to loading position for thereby selectively stepping said slide tray to bring the next forward or reverse slide into loading position.

6. In a slide projector, the combination including a projection lens system for projecting an image from a transparent slide onto a screen, a slide tray for receiving a plurality of transparent slides and normally movable in a step by step manner to successively bring the transparent slides disposed within the tray into a loading position, a driving motor, means actuated by said motor and effective in timed sequence to move the slide disposed in said loading position into a projection position relative to said lens system and thereafter to return such slide to said loading position in said tray, means for driving said slide tray in said step by step manner either forwardly or reversely, said driving means including a cooperable rotatable toothed element and a slidably and pivotally mounted driving dog, said driving dog having a first tooth effective upon pivotal movement of the dog in a first direction to engage a tooth on one edge of said toothed element and a second tooth effective upon pivotal movement of the dog in the opposite direction to engage a tooth on the opposite edge of said toothed element, said driving motor including an electromagnetic field magnet and a pivotal armature responsive to the energization of said field magnet, a blocker member movable by said armature and effective when the field magnet is deenergized to block said second dog tooth from engaging said toothed element and effective when the field magnet is energized to block said first dog tooth from engaging said toothed element, and cam means driven by said motor for slidably moving said dog upon the return of said slide to loading position and thereby effecting the movement of said slide in a stepped manner either forwardly or reversely accordingly as said blocker member blocks said second dog tooth or said first dog tooth to thereby position the selected next forward or reverse slide in loading position.

7. In a slide projector, the combination including a projection lens system for projecting an image from a transparent slide onto a screen, a slide tray for receiving a plurality of transparent slides and normally movable in a step by step manner to successively bring the transparent slides disposed within the tray into a loading position, an electric driving motor, means actuated by said motor and effective in timed sequence to move the slide disposed in said loading position into a projection position relative to said lens system and thereafter to return such slide to said loading position in said tray, means for driving said slide tray in said step by step manner either forwardly or reversely, said driving means including a cooperable rotatable toothed element and a slidably and pivotally mounted driving dog, said driving dog having a first tooth effective upon pivotal movement of the dog in a first direction to engage a tooth on one edge of said toothed element and a second tooth effective upon pivotal movement of the dog in the opposite direction to engage a tooth on the opposite edge of said toothed element, said driving motor including an electromagnetic field magnet and a pivotal armature responsive to the energization of said field magnet, an energizing circuit for said electric driving motor including a switch in series with the motor which opens momentarily just as such slide returns to loading position whereupon normally said motor and field magnet are temporarily deenergized with the motor momentarily coasting and said field magnet temporarily releasing said armature, selectively controlled switch means in parallel with said first switch for preventing the momentary deenergization of said motor and the temporary release of said armature, a blocker member movable by said armature and effective when the field magnet is deenergized to block said second dog tooth from engaging said toothed element and effective when the field magnet is energized to block said first dog tooth from engaging said toothed element, and cam means driven by said motor for slidably moving said dog upon the return of such slide to loading position and thereby effecting the movement of said slide in a stepped manner either forwardly or reversely accordingly as said second switch is opened or closed to thereby position the selected next forward or reverse slide in loading position.

References Cited in the file of this patent
UNITED STATES PATENTS 2,874,497  Huff et al. _____ Feb. 24, 1959